United States Patent
Shrestha et al.

(10) Patent No.: US 12,063,179 B2
(45) Date of Patent: Aug. 13, 2024

(54) ENABLED/DISABLED HARQ FEEDBACK AND HARQ-LESS PROCESSES

(71) Applicant: QUALCOMM Incorporated, San Diego, CA (US)

(72) Inventors: Bharat Shrestha, San Diego, CA (US); Umesh Phuyal, San Diego, CA (US); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 17/379,861

(22) Filed: Jul. 19, 2021

(65) Prior Publication Data

US 2022/0038243 A1    Feb. 3, 2022

Related U.S. Application Data

(60) Provisional application No. 63/059,114, filed on Jul. 30, 2020.

(51) Int. Cl.
*H04L 5/00* (2006.01)
*H04L 1/1812* (2023.01)
(Continued)

(52) U.S. Cl.
CPC .......... *H04L 5/0055* (2013.01); *H04L 1/1812* (2013.01); *H04W 72/1263* (2013.01); *H04W 72/23* (2023.01)

(58) Field of Classification Search
CPC .... H04L 5/0055; H04L 1/1812; H04W 72/23; H04W 72/1263
(Continued)

(56) References Cited

U.S. PATENT DOCUMENTS 11,496,996 B2 * 11/2022 Seo ................. H04L 1/1819
2022/0210823 A1 * 6/2022 Alfarhan ............ H04L 1/1887
(Continued)

OTHER PUBLICATIONS

Ericsson: "Text Proposal on DRX, HARQ and UL Scheduling", 3GPP TSG.RAN WG2 #108, Draft, R2-1916415, 3rd Generation Partnership Project (3GPP), Mobile Competence Centre, 650, Route Des Lucioles, F-06921 Sophia-Antipolis Cedex, France, vol. RAN WG2, No. Reno, Nevada, US, Nov. 18, 2019-Nov. 22, 2019, Nov. 29, 2019 (Nov. 29, 2019), pp. 1-7, URL: https://www.3gpp.org/ftp/tsg_ran/WG2_RL2/TSGR2_108/Docs/R2-1916415.zip, R2-1916415 TP on DRX HARQ and UL Scheduling.docx, [retrieved on Nov. 29, 2019], Section 7.2.1.2, Sections 7 .2.1.4-7 .2.1.5.

(Continued)

*Primary Examiner* — Obaidul Huq
(74) *Attorney, Agent, or Firm* — Procopio, Cory, Hargreaves & Savitch LLP

(57) ABSTRACT

This disclosure provides systems, devices, apparatus and methods, including computer programs encoded on storage media, for enabled/disabled HARQ feedback and HARQ-less processes. A base station may configure a plurality of logical channels for a UE, where one or more of the logical channels have an associated HARQ process. The UE may receive an allocation of resources from the base station for an uplink grant or a downlink assignment and determine whether the resources have associated HARQ process without HARQ feedback but with HARQ retransmission, an associated HARQ process without HARQ feedback and without HARQ retransmission, or an associated HARQ process with HARQ feedback and with HARQ retransmission. The UE may exchange communication with the base station based on the allocation of resources and the determination of whether the resources have one of the associated HARQ processes.

27 Claims, 13 Drawing Sheets

(51) Int. Cl.
*H04W 72/1263* (2023.01)
*H04W 72/23* (2023.01)

(58) Field of Classification Search
USPC .......................................... 370/310, 328, 329
See application file for complete search history.

(56) References Cited

U.S. PATENT DOCUMENTS

| | | | | |
|---|---|---|---|---|
| 2022/0264590 | A1* | 8/2022 | Han | H04L 1/1854 |
| 2022/0286235 | A1* | 9/2022 | Ranta-Aho | H04L 1/1887 |
| 2022/0294576 | A1* | 9/2022 | Kuo | H04L 1/1822 |
| 2022/0303055 | A1* | 9/2022 | Wu | H04W 28/26 |
| 2022/0330298 | A1* | 10/2022 | Cheng | H04W 72/23 |
| 2023/0261802 | A1* | 8/2023 | Kunt | H04L 1/1822 370/329 |

OTHER PUBLICATIONS

International Search Report and Written Opinion—PCT/US2021/042403—ISA/EPO—Nov. 2, 2021.

Mediatek Inc: "Summary for More Delay-Tolerant Re-Transmission Mechanisms in NR-NTN", 3GPP TSG RAN WG1 Meeting #97, Draft, 3rd Generation Partnership Project (3GPP), Mobile Competence Centre, 650, Route Des Lucioles, F-06921 Sophia-Antipolis Cedex, France, SO, vol. RAN WG1, No. Reno, Nevada, USA, May 13, 2019-May 17, 2019, May 16, 2019 (May 16, 2019), 8 Pages, XP051739945, URL: https://www.3gpp.org/ftp/tsg_ran/WG1_RL1/TSGR1_97/Docs/R1-1907656.zip, [retrieved on May 16, 2019], Section 2.1, Section 2.4, Section 3.2.

Nokia, et al., "Discussion on LCP Procedure for NTN," Draft, 3GPP TSG-RAN WG2 Meeting #107bis, R2-1913388, 3rd Generation Partnership Project (3GPP), Mobile Competence Centre, 650, Route Des Lucioles, F-06921, Sophia-Antipolis Cedex, France, vol. RAN WG2. No. Chongqing, China, Oct. 14, 2019-Oct. 18, 2019, Oct. 4, 2019 (Oct. 4, 2019). 5 pages, URL: https://ftp.3gpp.org/tsg_ran/WG2_RL2/TSGR2_107bis/Docs/R2-1913388.zip R2-1913388 Discussion on LCP procedure for NTN.docx [retrieved on Oct. 4, 2019] Section 1-2, Figure 1, The whole document.

Nomor Research GmbH: "Report of Email Discussion [106#71][NR/NTN] HARQ (Nomor)", 3GPP TSG-RAN WG2 Meeting #107, 3GPP Draft, R2-1908987_Email_HARQ_Options_for_NTN, 3rd Generation Partnership Project (3GPP), Mobile Competence Centre, 650, Route Des Lucioles, F-06921 Sophia-Antipolis Cedex, France, vol. RAN WG2, No. Prague, CZ, Aug. 26, 2019-Aug. 30, 2019, Aug. 14, 2019 (Aug. 14, 2019), 18 Pages, XP051766802, URL: https://www.3gpp.org/ftp/TSG_RAN/WG2_RL2/TSGR2_107/Docs/R2-1908987.zip, [retrieved on Aug. 14, 2019], Section 3.2.

Oppo: "Discussion on CG and SPS in NTN", 3GPP Draft, 3GPP TSG-RAN WG2 Meeting #108, R2-1915166, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019 (Nov. 8, 2019), XP051817062, 3 Pages, Retrieved from the Internet: URL: https://ftp.3gpp.org/tsg_ran/WG2_RL2/TSGR2_108/Docs/R2-1915166.zip. R2-1915166.doc [retrieved on Nov. 8, 2019] Section 1, Section 2, section 2.1.

U.S. Appl. No. 62/910,571, Inventor Cheng C-C., filed Oct. 4, 2019.

* cited by examiner

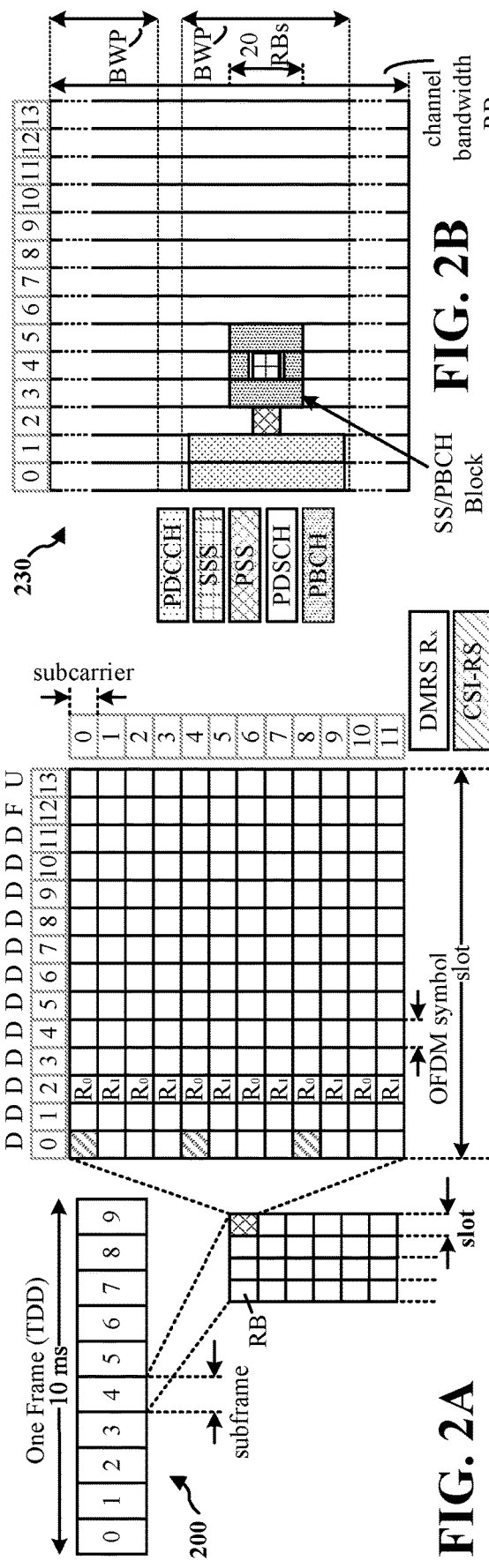
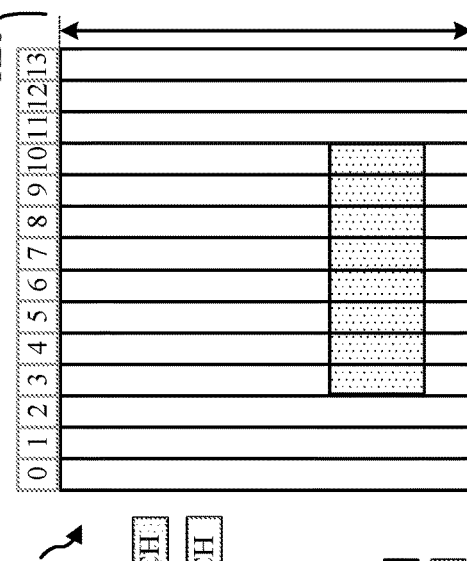
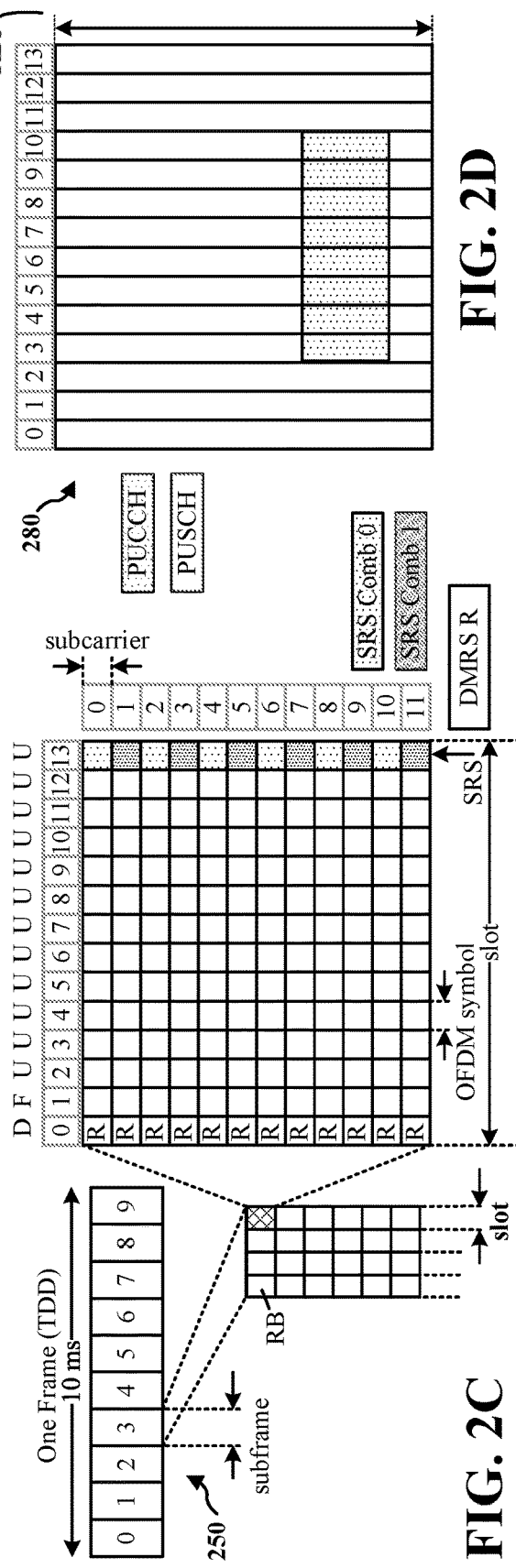
FIG. 2A  FIG. 2B  FIG. 2C  FIG. 2D

ENABLED/DISABLED HARQ FEEDBACK AND HARQ-LESS PROCESSES

CROSS REFERENCE TO RELATED APPLICATION(S)

This application claims the benefit of U.S. Provisional Application Ser. No. 63/059,114, entitled "ENABLED/DISABLED HARQ FEEDBACK AND HARQ-LESS PROCESSES" and filed on Jul. 30, 2020, which is expressly incorporated by reference herein in its entirety.

TECHNICAL FIELD

The present disclosure relates generally to communication systems, and more particularly, to hybrid automatic repeat request (HARQ) feedback enabled processes, HARQ feedback disabled processes, and HARQ-less processes.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a wireless device at a user equipment (UE) that includes a memory and at least one processor coupled to the memory. The memory may include instructions that, when executed by the at least one processor, cause the at least one processor to receive an allocation of resources from a base station for an uplink grant or a downlink assignment and determine whether the resources have an associated HARQ process type, the associated HARQ process type including at least one of a HARQ process without HARQ feedback but with HARQ retransmission, a HARQ process without HARQ feedback and without HARQ retransmission, or a HARQ process with HARQ feedback and with HARQ retransmission. The at least one processor may exchange communication with the base station based on the allocation of resources and the determination of whether the resources have one of the associated HARQ processes.

In an aspect of the disclosure, a method, a computer-readable medium, and an apparatus are provided. The apparatus may be a wireless device at a base station that includes a memory and at least one processor coupled to the memory. The memory may include instructions that, when executed by the at least one processor, cause the at least one processor to configure a plurality of logical channels for a UE, wherein one or more logical channels have an associated HARQ process type, the associate HARQ process type including at least one of a HARQ process without HARQ feedback but with HARQ retransmission, a HARQ process without HARQ feedback and without HARQ retransmission, or a HARQ process with HARQ feedback and with HARQ retransmission, transmit an allocation of resources for an uplink grant or a downlink assignment to the UE, and exchange communication with the UE based on the allocation of resources and a corresponding logical channel from the plurality of logical channels configured for the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
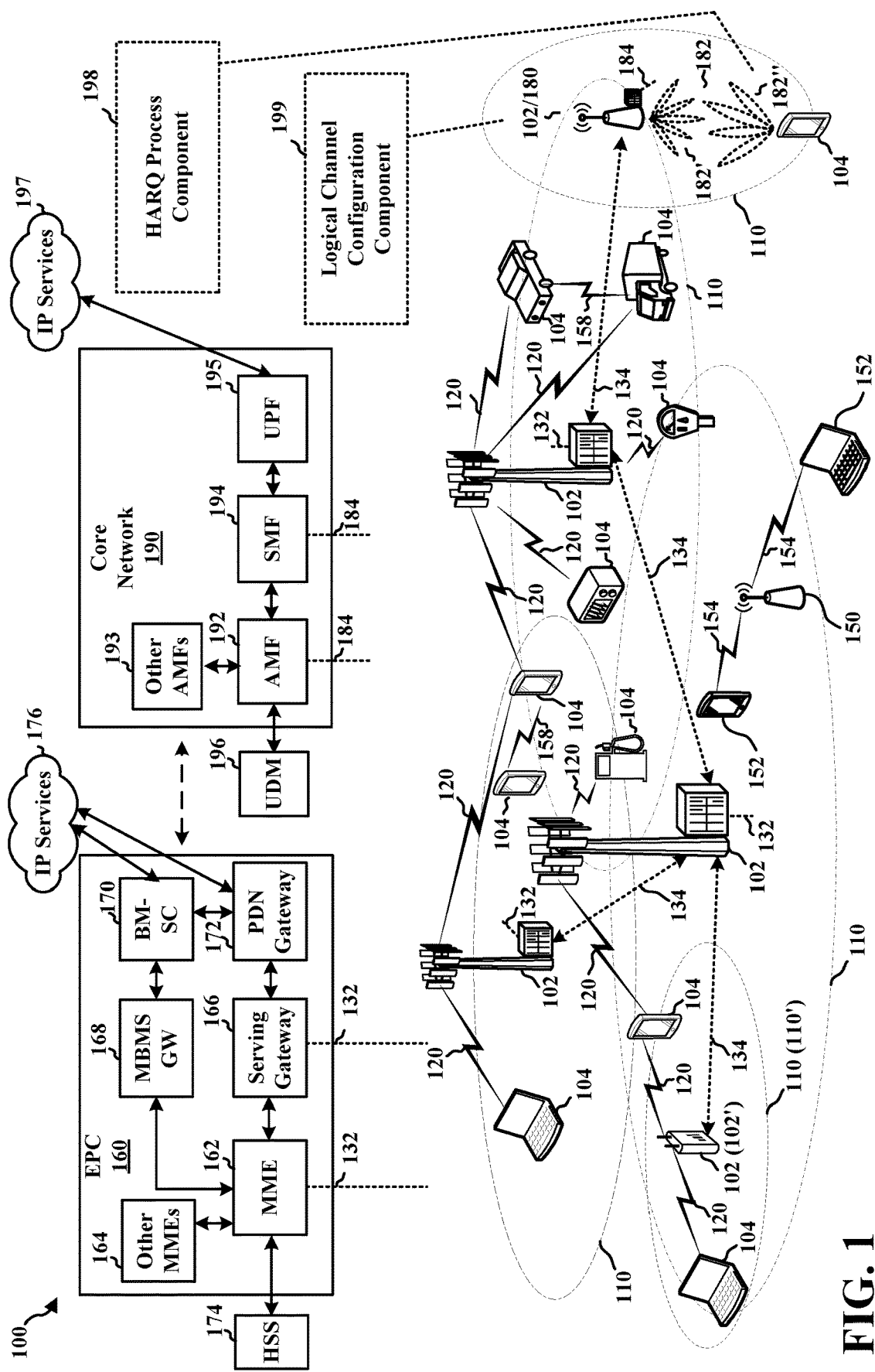
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

Due to propagation delays associated with non-terrestrial networks (NTNs), hybrid automatic repeat request (HARQ) feedback may be disabled (e.g., based on a configuration) to avoid stalling of HARQ processes. In examples, the propagation delay may be based on a user equipment (UE) having to transmit data to a satellite, and the satellite having to further transmit the data to a base station. Long propagation delays associated with such communications may cause the UE to wait for an extended period of time before receiving HARQ feedback. For example, low earth orbit (LEO) communications may correspond to a delay of 25 ms, where the UE may be unable to determine (e.g., for 25 ms) whether the transmitted data was successfully received, or whether to transmit a retransmission of the data. Thus, a throughput of the data may be reduced based on an increase in the propagation delay.

In examples, there may be 16 HARQ processes for which the UE may be transmitting data. If the HARQ processes are stalled based on all 16 HARQ processes being in use, and the UE has further data to transmit, the UE may have to refrain from performing the further transmissions until the UE determines whether one or more of the previous transmissions are successful transmissions or failed transmissions. In order to avoid stalled HARQ processes caused by long propagation delays, some of the HARQ processes may have feedback procedures disabled when the UE transmits subsequent uplink data or when the network transmits subsequent downlink data. Accordingly, when the UE transmits data, the UE may not have to wait for HARQ feedback to be received. The UE may perform the data transmission and move onto a next data transmission. The network may similarly transmit data and move onto a next data transmission.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a HARQ process component 198 configured to receive an allocation of resources for an UL grant or a DL assignment; determine whether the resources have an associated HARQ process type, the associated HARQ process type including at least one of a HARQ process without HARQ feedback but with HARQ retransmission, a HARQ process without HARQ feedback and without HARQ retransmission, or a HARQ process with HARQ feedback and with HARQ retransmission; and exchange communication with a base station based on the allocation of resources and the determination of whether the resources have one of the associated HARQ processes. In certain aspects, the base station 180 may include a logical channel configuration component 199 configured to configure a plurality of logical channels for a user equipment, where one or more logical channels have an associated HARQ process type, the associate HARQ process type including at least one of a HARQ process without HARQ feedback but with HARQ retransmission, a HARQ process without HARQ feedback and without HARQ retransmission, or a HARQ process with HARQ feedback and with HARQ retransmission; transmit an allocation of resources for an uplink grant or a downlink assignment to the UE; and exchange communication with the UE based on the allocation of resources and a corresponding logical channel from the plurality of logical channels configured for the UE. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
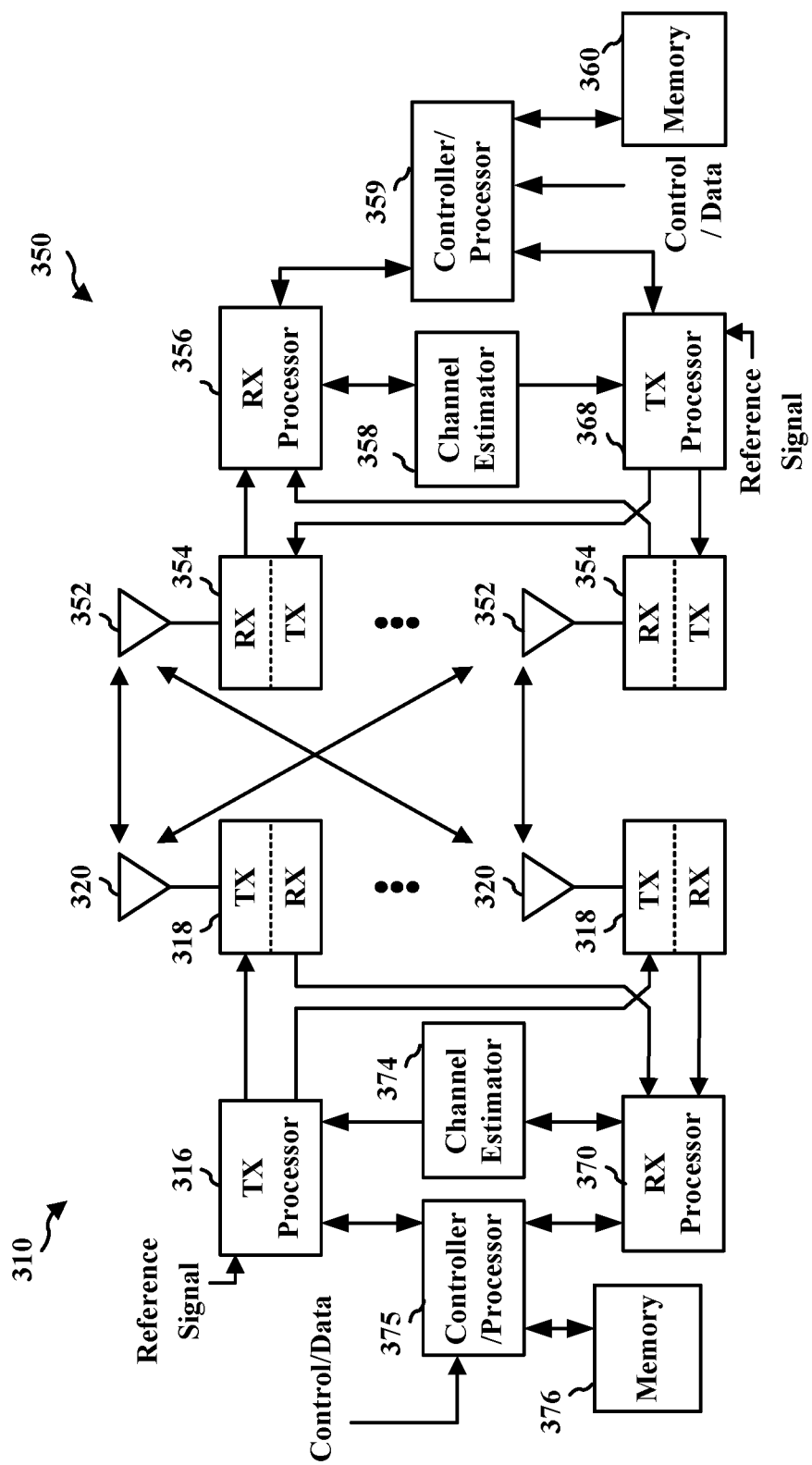
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an acknowledgment (ACK) and/or negative acknowledgment (NACK) protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the HARQ process component 198 of FIG. 1.

At least one of the TX processor 316, the RX processor 370, and the controller/processor 375 may be configured to perform aspects in connection with the logical channel configuration component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
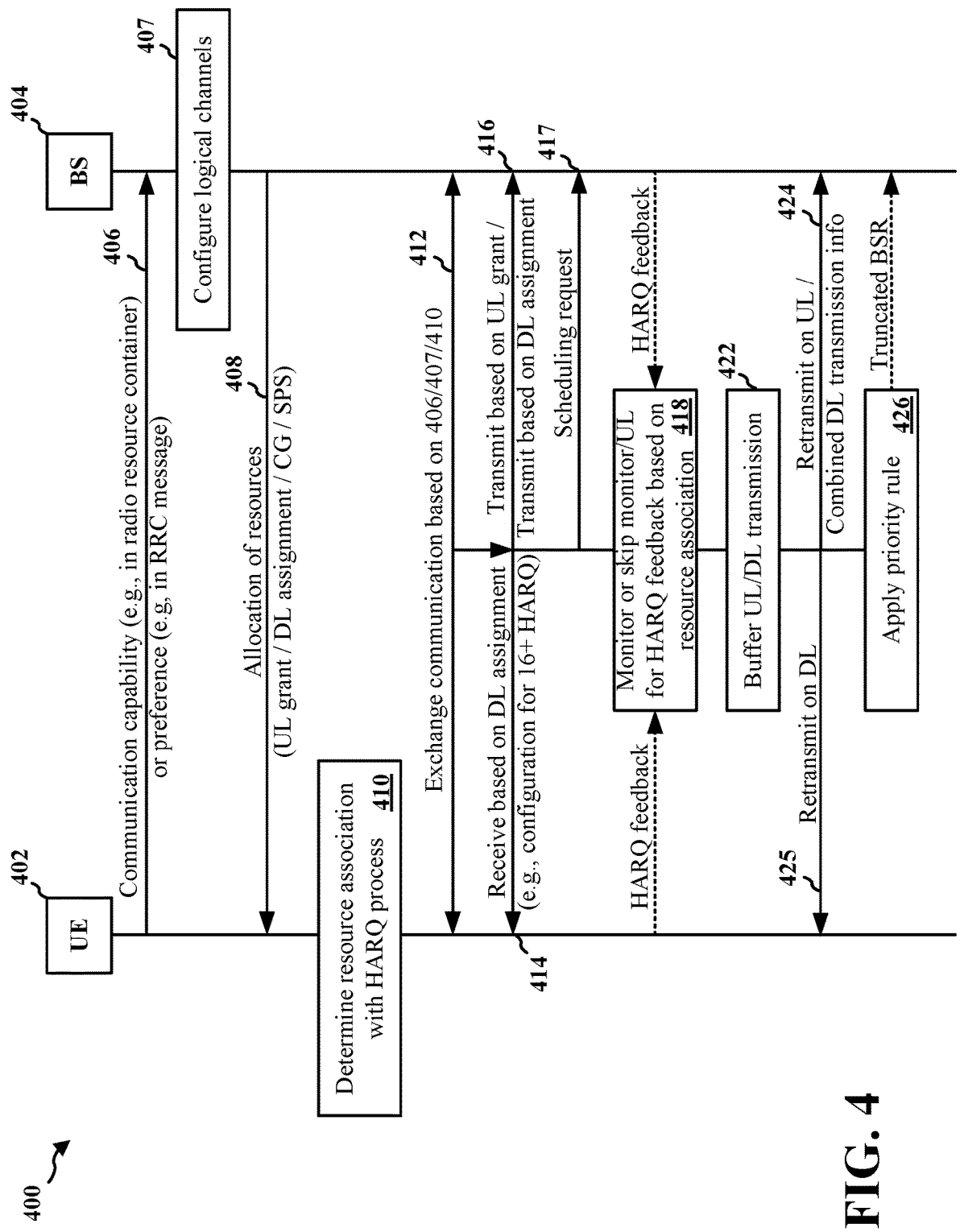
FIG. 4 is call flow diagram illustrating communications between a UE and a base station.

FIG. 4 is a call flow diagram 400 illustrating communications between a UE 402 and a base station 404. At 406, the UE 402 may provide a communication capability (e.g., in a radio resource container) or a preference (e.g., in an RRC message) to the base station 404. At 407, the base station 404 may configure logical channels for the UE 402. At 408, the base station 404 may allocate resources to the UE 402. The allocated resources may include an UL grant, a DL assignment, a configured grant (CG), or semi-persistent scheduling (SPS). At 410, the UE 402 may determine a resource association with a HARQ process (e.g., HARQ feedback enabled, HARQ feedback disabled, or HARQ turned off/HARQ-less).

At 412, the UE 402 and the base station 404 may exchange communication based on the communication capability/preference reported at 406, the logical channels configured at 407, and/or the determination of the resource association with the HARQ process at 410. If the allocation of resources, at 408, includes the UL grant, the exchanged communication, at 412, may include transmission, at 416, of the UL transmission based on the UL grant. Alternatively, if the allocation of resources, at 408, includes the DL assignment, the exchanged communication, at 412, may include receiving, at 414, a DL transmission based on the DL assignment and/or transmitting, at 416, HARQ feedback for the DL transmission if the resources have the association with the HARQ feedback. When the HARQ feedback is enabled, the UE 402 may receive, at 414, a configuration for 16 or more HARQ processes.

At 417, the UE may transmit a scheduling request based on a configuration of the logical channels, at 407, that do not have the association with at least one of HARQ feedback or HARQ retransmission. At 418, the UE 402 may monitor for HARQ feedback if the allocation of resources, at 408, have the association with the HARQ feedback or the UE 402 may skip monitoring for the HARQ feedback if the allocation of resources, at 408, do not have the association with the HARQ feedback. If the allocation of resources, at 408, include the CG, the UE 402 may skip, at 418, an UL transmission based on the CG.

At 422, the UE 402 may buffer the UL transmission and retransmit on UL, at 424, based on a retransmission grant received from the base station 404. In further aspects, at 422, the UE 402 may buffer the DL transmission and combine the DL transmission information with the retransmission, at 424, to the base station 404. At 425, the base station 404 may retransmit on DL based on buffering, at 422, the DL transmission that was transmitted at 414.

At 426, the UE 402 may apply a priority rule to transmit a truncated BSR to the base station 404. In further aspects, at 426, the base station 404 may apply the priority rule to allocate the resources based on an intended use of a HARQ process.

Figure 5:
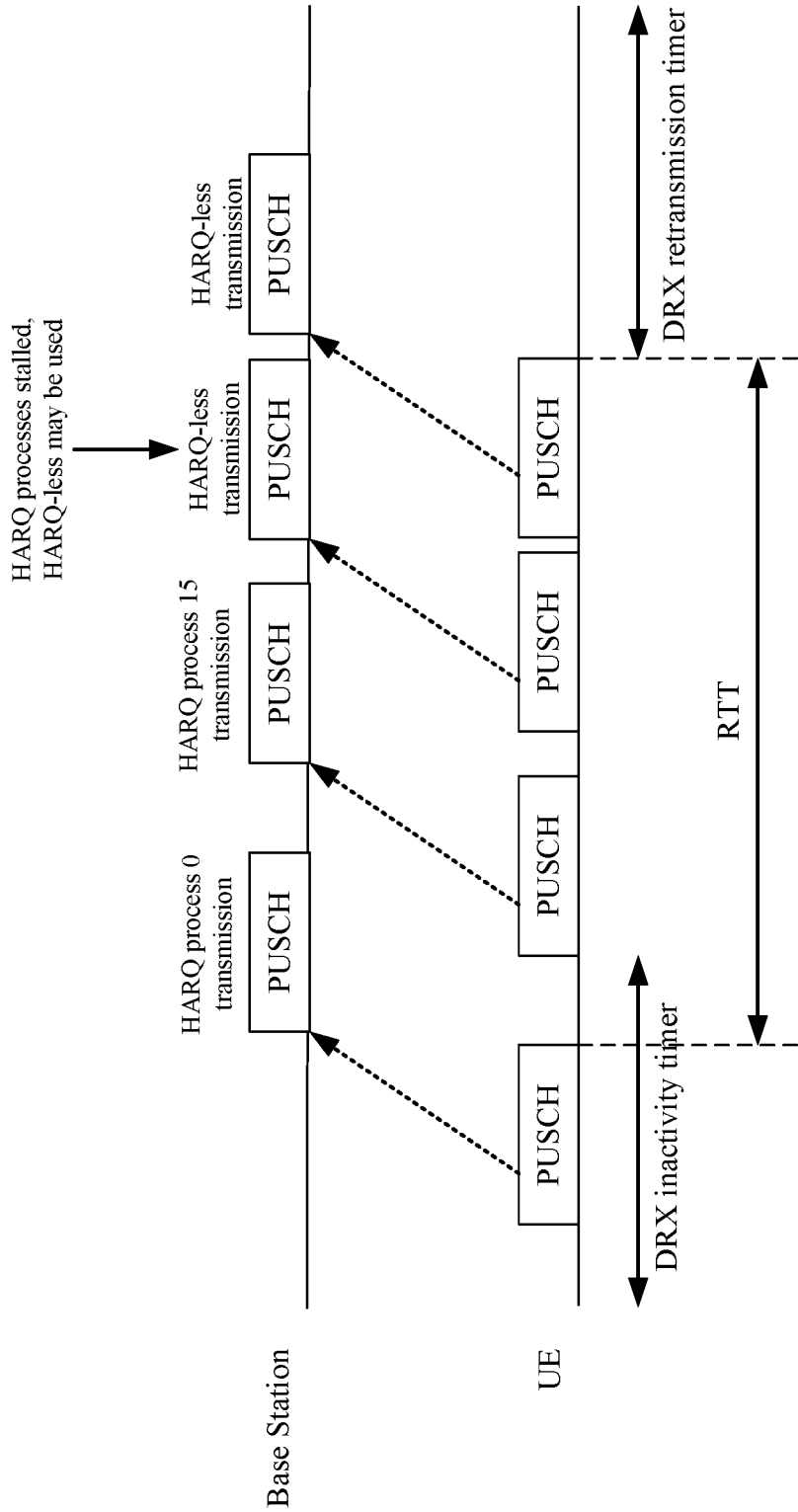
FIG. 5 illustrates a diagram for HARQ-less processes that may be enabled when available HARQ processes are in use.

FIG. 5 is a diagram 500 for HARQ-less processes that may be enabled when available HARQ processes are in use. Due to propagation delays associated with non-terrestrial networks (NTNs), HARQ feedback may be disabled (e.g., based on a configuration) to avoid stalling of HARQ processes. In examples, the propagation delay may be based on a UE having to transmit data to a satellite, and the satellite having to further transmit the data to a base station. For low earth orbit (LEO) communications and geostationary earth orbit (GEO) communications compatible with high altitude platform stations (HAPS) and air-to-ground (ATG) stations, an earth-fixed tracking area may be identified for earth-fixed and moving cells, where UEs with global navigation satellite system (GNSS) capabilities may be assumed by the network. Long propagation delays associated with such communications may cause the UE to wait for an extended period of time before receiving feedback. In the case of LEO communications, the delay may be 25 ms. As such, the UE may be unable to determine, e.g., for 25 ms, whether the transmitted data was successfully received, or whether to transmit a retransmission of the data. A throughput of the data may be reduced based on an increase in the propagation delay.

In examples, there may be 16 HARQ processes for which the UE may be transmitting data. If the HARQ processes are stalled based on all 16 HARQ processes being in use, and the UE has further data to transmit, the UE may have to refrain from performing the further transmissions until the UE determines whether one or more of the previous transmissions are successful transmissions or failed transmissions. Additionally or alternatively, one or more of the HARQ processes may be determined as a subsequent HARQ process that may correspond to transmission of subsequent data. In order to avoid stalled HARQ processes caused by long propagation delays, some of the HARQ processes may have feedback procedures disabled when the UE transmits subsequent UL data or when the network transmits subsequent DL data. Accordingly, when the UE transmits data, the UE may not have to wait for feedback to be received. The UE may perform the data transmission and move onto a next data transmission. The network may similarly transmit data and move onto a next data transmission.

In configurations, the UE may transmit data and wait for feedback to be received from the network in DL or the UE may receive the data from the network and transmit the feedback in UL. If the UE transmits the data and receives NACK feedback, the UE may retransmit the data (e.g., based on a retransmission grant). If the UE receives a retransmission from the network, the UE may transmit corresponding feedback to the network. As some feedback may require retransmissions to be performed over an extended timeframe, feedback procedures may be disabled in certain configurations, regardless of whether retransmission is still to occur or not occur (e.g., one short transmission). For example, the UE may perform X number of HARQ processes (e.g., 16 HARQ processes) that may correspond to X number of HARQ buffers. Y out of X HARQ processes may have the HARQ feedback disabled (e.g., the value of Y may be set to 1 or 0). In such cases, the UE may not transmit the HARQ feedback, even though retransmission may still occur.

The HARQ-less processes associated with the diagram 500 may be enabled automatically or enabled dynamically, such as by DCI, when the HARQ process is stalled (e.g., when all available HARQ processes are in use). The HARQ-less process may be configurable. An indication of whether the DL assignment or the UL grant is associated with a HARQ-less process may be provided in the control region (e.g., PDCCH).

DL data received by the UE may not correspond to a HARQ process or include a HARQ process identifier (ID) (e.g., "one shot" transmissions or no HARQ retransmissions). In some cases, a preconfigured ID may be provided for the HARQ process. For example, a HARQ process ID (e.g., HARQ process ID 15) may be reserved to indicate a HARQ-less process, or DCI may be modified to indicate the HARQ-less process. In instances of a reserved HARQ process ID, the reservation may be maintained for such processes, so that the ID may not be used by other mechanisms, such as feedback mechanisms.

The HARQ-less process may be enabled or disabled by the network (e.g., based on current network congestion). For instance, if all available HARQ processes X are in use, the UE may have to wait for ACK feedback regardless of whether the UE has further UL data to transmit to the network, or whether the network has further DL data to transmit to the UE. Hence, if no HARQ processes are available, the network or the UE may use the HARQ-less transmission. In some cases, one or more reserved or preconfigured HARQ process IDs may be used for such purposes. Timers used for determining retransmission mechanisms may not be needed (e.g., round trip time (RTT) timers and/or discontinuous reception (DRX) timers). That is, since there may be no retransmissions, HARQ processes may not be used or, for the HARQ process ID, a balance of such timers may be set to zero.

Figure 6:
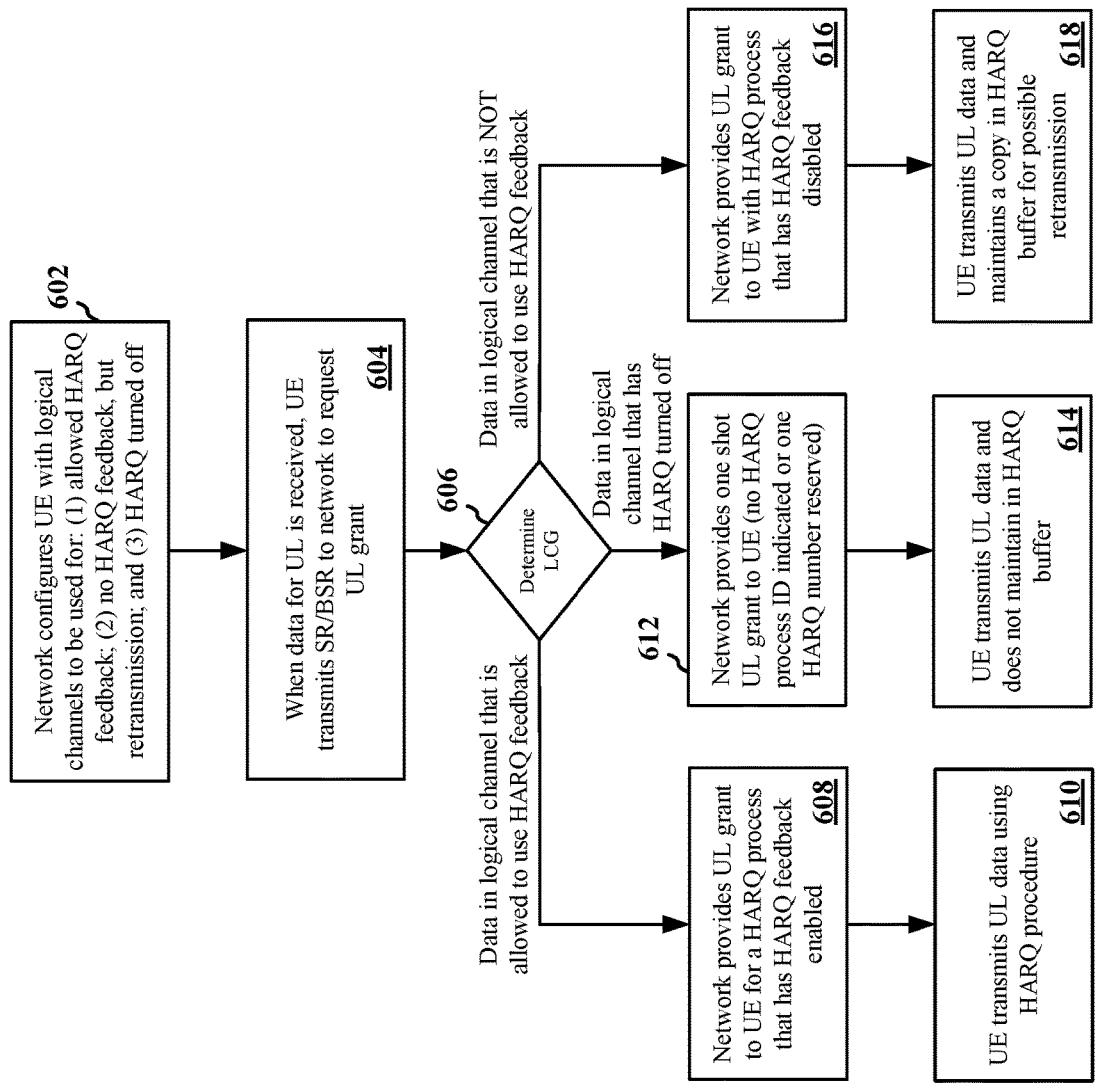
FIG. 6 is a flowchart for transmitting UL data based on different logical channel configurations.

FIG. 6 is a flowchart 600 for transmitting UL data based on different logical channel configurations. At 602, the network may configure the UE based on UL HARQ processes/logical channels that include the HARQ feedback being enabled, the HARQ feedback being disabled but retransmissions being allowed, and/or the HARQ process not being configured (e.g., the HARQ process being "turned off"). In aspects, all three mechanisms may be used at a same time. In further aspects, a subset of the mechanisms may be enabled/disabled at a given time. The network may configure the logical channel using an RRC message. The parameters of the logical channel may indicate whether HARQ feedback is allowed, whether the logical channel is based on no HARQ feedback but retransmission is allowed, and/or whether the HARQ processes is turned off. When a higher layer sends data to the UE, the UE may determine a logical channel for transmitting UL data. The determination of the logical channel may be based on a QoS adjustment procedure of the UE.

At 604, when data for the UL is received, the UE may transmit a scheduling request (SR)/buffer status report (BSR) to the network to request an UL grant. The SR/BSR may be based on conditions of a logical channel or a logical channel group (LCG). For example, a BSR transmitted on a SR may group some logical channels together and assign an ID to the group that the UE may use to indicate, in the BSR, an amount of data that is available for the group. When the network receives the BSR, the network may determine an amount of data that is currently pending in the LCG(s) as well as a resource allocation for the UE to transmit the currently pending data in the LCG(s).

In examples, the UE may report 8 different LCGs in the BSR and the UE may be configured with 8 different SRs. Each logical channel configuration may correspond to one LCG. The UE may provide an indication to the network of UL data to be transmitted in an LCG1 (e.g., the UE may provide a SR) so that resources may be allocated for the UL data. Thus, the UL data received in the LCG may include one or more logical channels. The network may configure one or more LCGs to include 1 logical channel or, in further examples, the network may configure one or more of the 8 LCGs to each include up to 8 logical channels. To transmit the SR for a particular configuration or send the BSR, the UE may determine, at 606, the LCG for which the UL data is to be transmitted. The SR configuration may be configured for a logical channel or LCG that does not require HARQ feedback or HARQ retransmission. Based on the configuration, the network may determine other portions of the LCG that may utilize the HARQ process.

If data in the logical channel is allowed to use HARQ feedback, the network may provide, at 608, an UL grant to the UE based on a HARQ process that has the HARQ feedback enabled. The UL grant may include a HARQ process ID indicative of the enabled feedback. After receiving the UL grant, the UE may transmit, at 610, the UL data using the HARQ process. Further, the UE may perform a retransmission after the RTT based on receiving an UL retransmission grant.

If the data corresponds to a logical channel for which the HARQ process is turned off, the network may provide, at 612, an UL grant for a one shot transmission, as the UE is not configured for retransmission on the logical channel. The UE may transmit, at 614, the UL data and not maintain the UL data in a HARQ buffer. Thus, at 612, either no HARQ process ID is indicated or one HARQ number is reserved for HARQ turn off configurations.

If the data corresponds to a logical channel where there is no HARQ feedback but retransmission is allowed, the network may provide, at 616, an UL grant to the UE based on a HARQ process that has the HARQ feedback disabled. At 618, the UE may transmit the UL data and maintain a copy of the UL data in a HARQ buffer for possible retransmission. In examples, after the UE transmits the UL data, and before the RTT has elapsed (e.g., before enough time has elapsed for feedback to be received), the UE may receive a second UL grant for retransmission of the UL data. In this manner, with HARQ feedback disabled, the UE may transmit the same UL data multiple times.

Additionally or alternatively, retransmission may be pre-configured based on adaptive retransmission techniques (e.g., an UL retransmission grant may be received for retransmitting the UL data a certain number of slots after the initial transmission). Adaptive retransmission may be associated with a retransmission window that may be defined based on a DRX retransmission timer. The UE may be configured to perform "blind" retransmissions, where the UL data is transmitted multiple times (e.g., 1, 2, 3, etc.) and not stored/maintained in the HARQ buffer. The UE may also combine retransmitted PDUs when HARQ feedback is disabled.

The UE may receive an UL grant based on a control information message, such as a PDCCH. The control may be included in DCI that indicates the HARQ process ID. The UE and the network may determine whether to prioritize and transmit the UL grant based on a priority rule. The priority rule may be defined for the UE to report a truncated BSR, or for the network to allocate the UL grant based on the corresponding HARQ process in cases where multiple LCGs have data to transmit. In configurations, a HARQ-less process or a HARQ enabled process may be prioritized.

Figure 7:
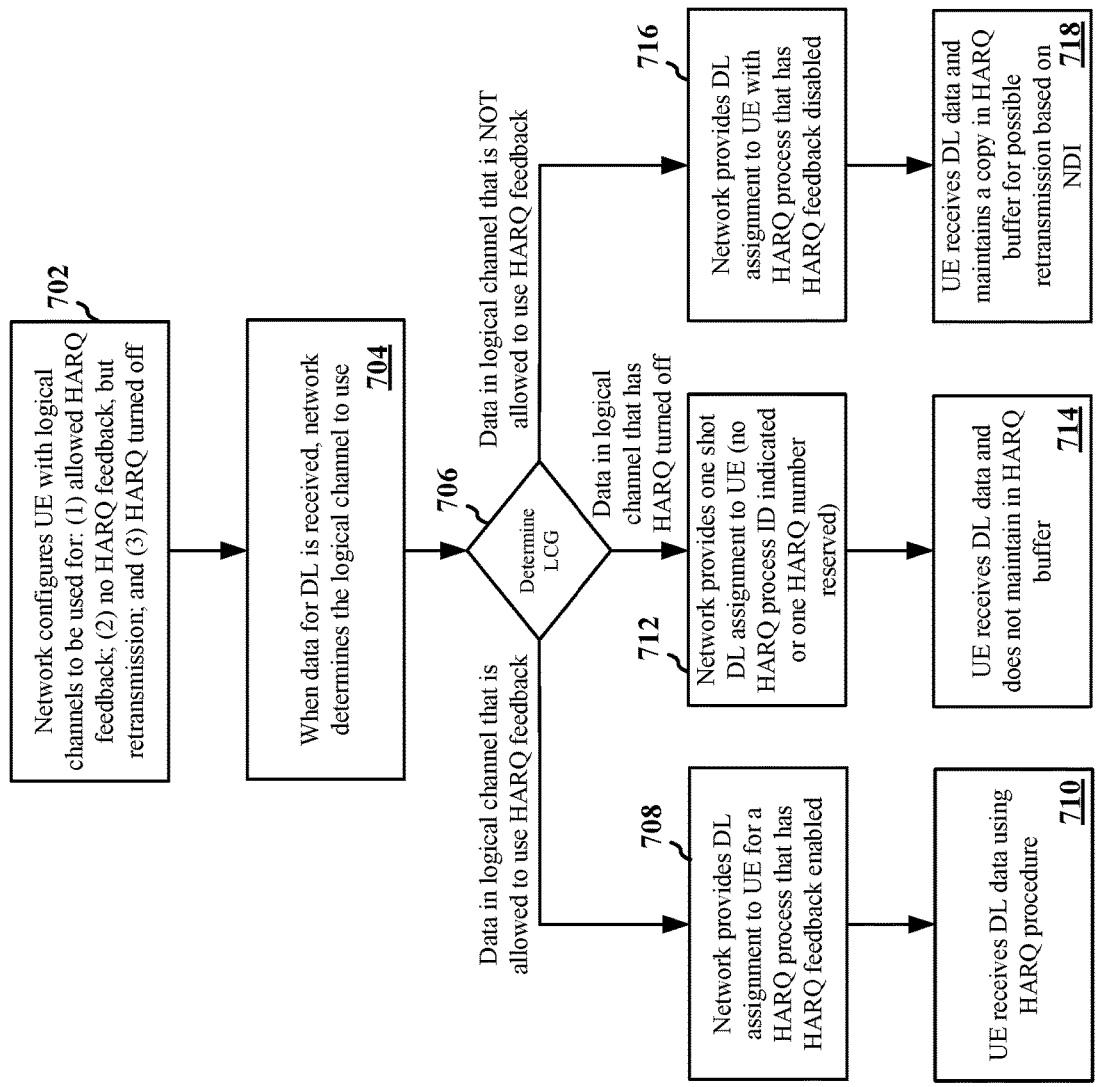
FIG. 7 is a flowchart for transmitting DL data based on different logical channel configurations.

FIG. 7 is a flowchart 700 for transmitting DL data based on different logical channel configurations. At 702, the network may configure the UE based on logical channels that include the HARQ feedback being enabled, the HARQ feedback being disabled but retransmissions being allowed, and/or the HARQ process not being configured (e.g., the HARQ process being turned off). When data for the DL is received, at 704, the network may determine, at 706, which logical channel/LCG to utilize.

If data in the logical channel is allowed to use HARQ feedback, the network may provide, at 708, a DL assignment to the UE based on a HARQ process that has the HARQ feedback enabled. After providing the DL assignment, the UE may receive from the network, at 710, the DL data using the HARQ process.

If the data corresponds to a logical channel for which the HARQ process is turned off, the network may provide, at 712, a DL assignment to the UE via one shot transmission. The UE may receive, at 714, the DL data and not maintain the DL data in a HARQ buffer. Thus, at 712, either no HARQ process ID is indicated or one HARQ number is reserved for HARQ turn off configurations.

If the data corresponds to a logical channel where there is no HARQ feedback but retransmission is allowed, the network may provide, at 716, a DL assignment to the UE based on a HARQ process that has the HARQ feedback disabled. At 718, the UE may receive the DL data and maintain a copy of the DL data in a HARQ buffer for possible retransmission based on a network device interface (NDI).

In DL aspects, when the HARQ process is stalled (e.g., when all HARQ processes are in use), the network may transmit further DL data without the HARQ process, but may use a low block error rate (BLER) or repetitions. Thus, the BLER may be low for a HARQ-less process. For HARQ feedback enabled/disabled configurations, the BLER may be different for the different enabled/disabled configurations.

For CGs for UL transmissions or SPS for DL transmissions, the HARQ process ID may be determined from a current symbol where the UL/DL grant is configured. For instance, the UE may be configured with an UL grant that may be available periodically (e.g., every 10 ms) for which the UE may have an opportunity to transmit data. Similarly, the network may schedule DL data periodically (e.g., every 10 ms). Given that the HARQ process may be determined from the current slot, the HARQ process may be 0 when the UE is in slot 0, the HARQ process may be 1 when the UE is in slot 1, etc. Accordingly, when the UE has UL data to transmit and the UL CG opportunity occurs in slot 1, the HARQ process may be 1. The UE may not have control over times at which the CG opportunity occurs. If the UE determines to transmit on slot 1, for example, HARQ process 1 may be used by the UE for the transmission.

If HARQ process 1 corresponds to a HARQ process having no feedback or a HARQ-less process/HARQ-less process ID, the HARQ process 1 may not be suitable for an UL data transmission when the UE determines to transmit the UL data based on the HARQ feedback being enabled. Thus, if there is UL data in the logical channel associated with HARQ feedback/HARQ retransmission, but the HARQ process ID determined from the slot corresponds to a HARQ process having disabled feedback/retransmission, the CG may be skipped and the UE may wait for another CG opportunity. The UE may compute the HARQ process ID for another CG opportunity and, if the HARQ process ID again corresponds to a HARQ process with disabled feedback, the UE may again skip the other CG opportunity.

Since multiple skips may cause a delay in transmitting the UL data, the UE may be configured with multiple SPS or multiple CG opportunities (e.g., 3 UL grants, 3 CGs, 3 SPS configurations), where a first CG or a first SPS configuration may correspond to the HARQ process having the disabled feedback, a second CG or a second SPS configuration may correspond to the HARQ-less process, and a third CG or a third SPS configuration may correspond to the HARQ process having the enabled feedback. The configuration may use the HARQ process ID that is configured from the slot, even if the HARQ process is disabled, as the UE may use the slot for providing the UE with a particular HARQ process. In some cases, the HARQ process ID may be disregarded by the UE and the HARQ process may be based on the network configuring each SPS and/or each CG among a maximum number of CG configurations, regardless of whether the UL/DL CG is HARQ-less, the HARQ feedback is disabled, or the HARQ feedback is enabled, and also regardless of the HARQ process ID.

If HARQ retransmission is disabled, a CG timer may not be configured (e.g., the timer may be turned off), which may indicate that the particular configuration for the SPS or the CG corresponds to the HARQ process having the disabled UL retransmission. That is, the UE may not store/maintain data in the HARQ buffer and the UE may not calculate the HARQ process ID. If HARQ feedback is disabled, dynamic scheduling of retransmissions may be performed using a single cell radio network temporary identifier (SC-RNTI) within a relative time difference (RTD). The UE may transmit UL data and be immediately available to receive another request to retransmit the same data. The transmission may be performed using the CG, but the retransmission may be a dynamic grant based on the SC-RNTI.

For each configuration for SPS or CG, the network may configure a number of HARQ processes. For example, if the UE is configured with 3 SPS configurations, the network may configure 1 HARQ process for the first configuration, 2 HARQ processes for the second configuration, and 3 HARQ processes for the third configuration. The number of HARQ processes supported via CG may be 16 or more when the HARQ feedback/retransmission is enabled.

If HARQ feedback/retransmission is disabled, the network may configure the number of HARQ processes to be equal to 1, where the HARQ process ID may be equal to 0. If the UE is configured for a HARQ-less process, the network may not perform any further configurations. The HARQ process ID of 0 may correspond to disabled feedback for which the UE may determine that CG transmissions have no HARQ feedback. In cases where multiple SPS or CGs are configured, HARQ feedback disabled/HARQ retransmission disabled may be configured based on the HARQ process ID number 0 by setting nrofHARQ-Processes=1 for the configuration.

The UE may report a preference (e.g., via UL RRC message) and/or a capability (e.g., via radio capability container) to use a HARQ-less UL/DL transmission. The preference may indicate that the UE prefers to be configured with both a HARQ-less UL/DL transmission and a HARQ process with feedback disabled. The UE may similarly report that the HARQ-less UL/DL transmission should be used if all the supported HARQ processes are stalled. The UE may report the preference/capability for prioritizing the HARQ-less process, the HARQ process with feedback disabled, and the HARQ process with feedback enabled for scheduling a DL transmission or providing an UL grant. The UE may report two LCGs (e.g., a first LCG corresponding to HARQ feedback disabled and a second LCG corresponding to the HARQ-less process). If the network determines to prioritize the processes, the network may perform a self-determination of priority or the network may follow a predefined rule for selecting/prioritizing the processes. In aspects, the UE may report a preference for the prioritization. For example, the UE may prefer to prioritize the HARQ-less process or the UE may report that the HARQ with feedback enabled should be prioritized.

Figure 8:
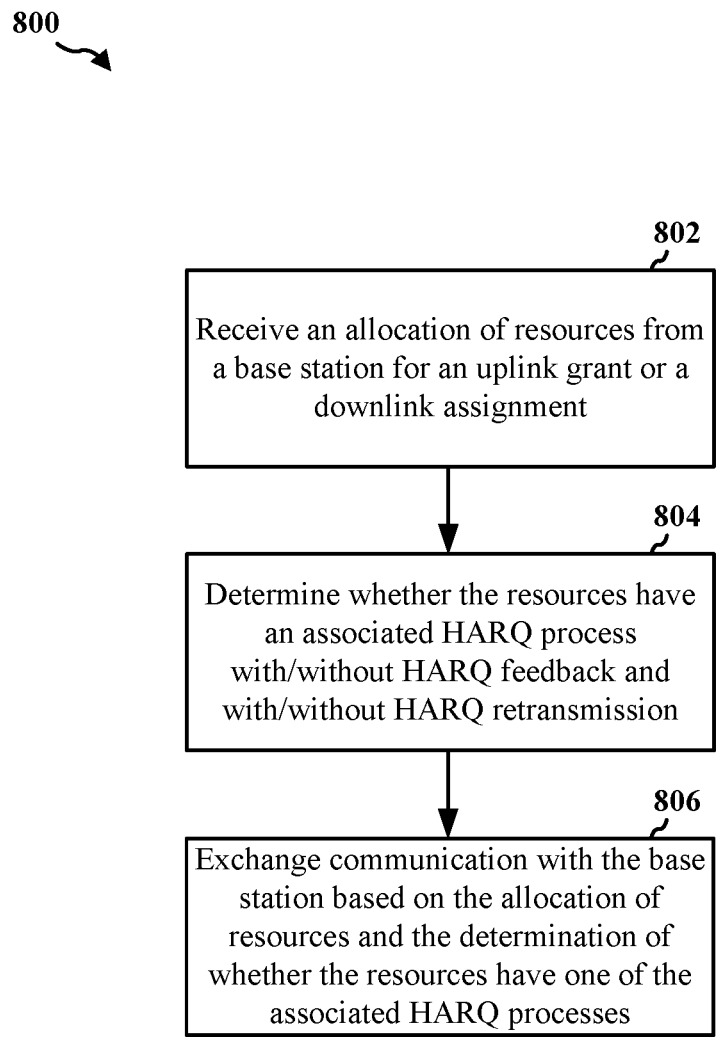
FIG. 8 is a flowchart of a method of wireless communication at a UE.

FIG. 8 is a flowchart 800 of a method of wireless communication. The method may be performed by a UE, e.g., the UE 104, which may include the memory 360 and which may be the entire UE 104 or a component of the UE 104, such as the TX processor 368, the RX processor 356, and/or the controller/processor 359. The method may provide an improved technique for reducing delayed HARQ conditions.

At 802, the UE may receive an allocation of resources from a base station for an uplink grant or a downlink assignment. For example, referring to FIG. 4, the UE 402 may receive, at 408, from the base station 404 an allocation of resources that includes an UL grant, a DL assignment, a CG, or SPS. The reception, at 802, may be performed by the reception component 1230 of the apparatus 1202 in FIG. 12.

At 804, the UE may determine whether the resources have an associated HARQ process without HARQ feedback but with HARQ retransmission, an associated HARQ process without HARQ feedback and without HARQ retransmission, or an associated HARQ process with HARQ feedback and with HARQ retransmission. For example, referring to FIG. 4, the UE 402 may determine, at 410, a resource association with a HARQ process. The UE 402 may determine whether the resources have one of the associated HARQ processes based on DCI from the base station 404 and/or the UE 402 may determine whether the resources have one of the associated HARQ processes based on whether a set of HARQ processes is in use. The resources may not have the associated HARQ process with the HARQ feedback and the HARQ retransmission if the HARQ process is disabled for the associated resources and/or the resources may not have the associated HARQ process with the HARQ feedback if the HARQ feedback is not configured for a logical channel group on which data is available for transmission. The determination, at 804, may be performed by the determination component 1242 of the apparatus 1202 in FIG. 12.

At 806, the UE may exchange communication with the base station based on the allocation of resources and the determination of whether the resources have one of the associated HARQ processes. For example, referring to FIG. 4, the UE 402 may exchange communication, at 412, with the base station 404 based on the allocation of resources, at 408, and the determination, at 410, of resource association with a HARQ process. The exchange, at 806, may be performed by the exchanger component 1244 of the apparatus 1202 in FIG. 12.

Figure 9:
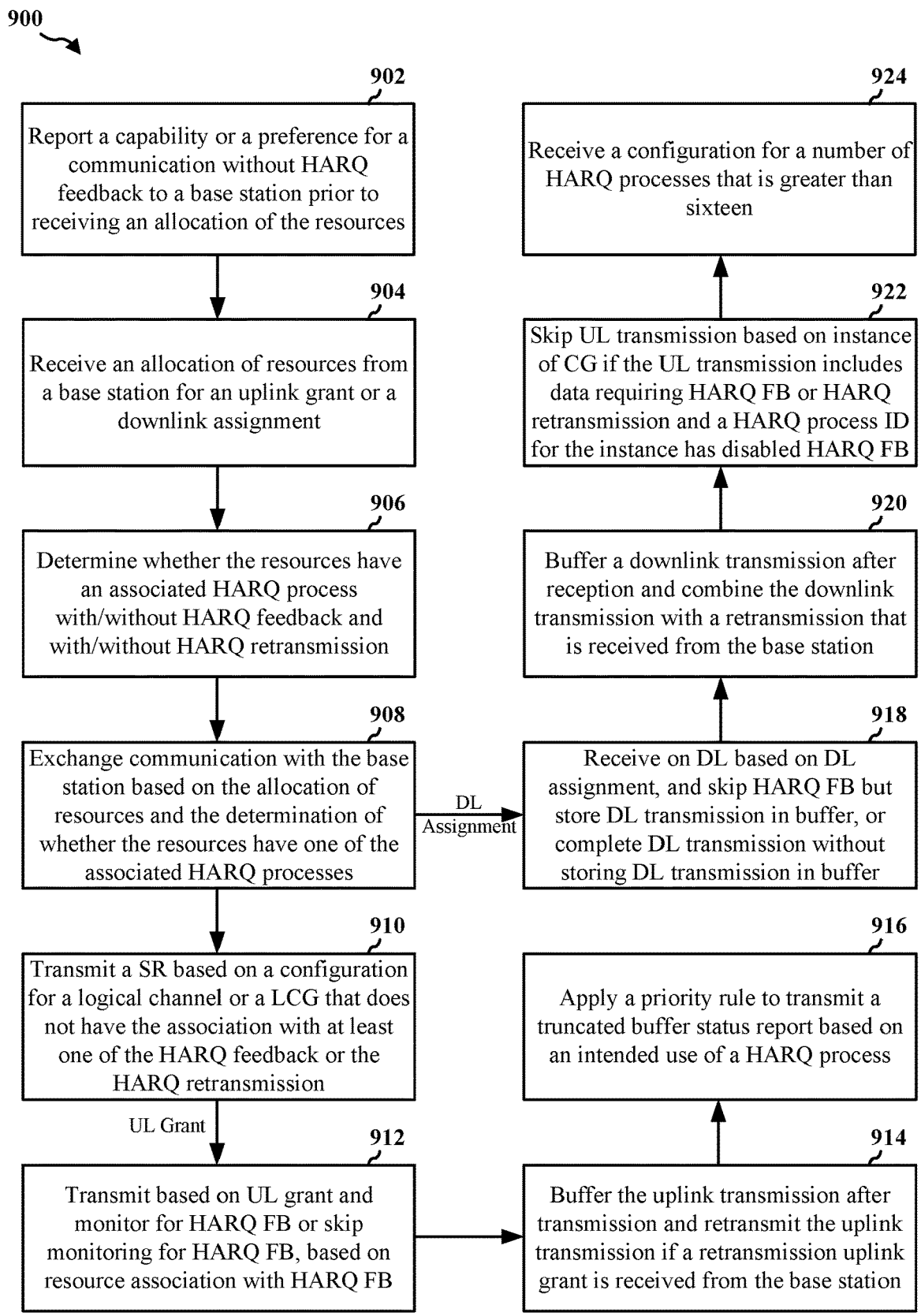
FIG. 9 is a flowchart of a method of wireless communication at a UE.

FIG. 9 is a flowchart 900 of a method of wireless communication. The method may be performed by a UE, e.g., the UE 104, which may include the memory 360 and which may be the entire UE 104 or a component of the UE 104, such as the TX processor 368, the RX processor 356, and/or the controller/processor 359. The method may provide an improved technique for reducing delayed HARQ conditions.

At 902, the UE may report a capability or a preference for a communication without HARQ feedback to the base station prior to receiving an allocation of resources. For example, referring to FIG. 4, the UE 402 may report, at 406, the communication capability or preference of the UE 402 to the base station 404 prior to receiving, at 408, the allocation of resources. The capability or the preference may be for at least one of uplink transmission without the HARQ feedback, downlink transmission without the HARQ feedback, the HARQ feedback to use if all supported HARQ processes are in use, a combination of the uplink transmission or the downlink transmission with the HARQ feedback and a HARQ process with disabled HARQ feedback and HARQ retransmission, and a HARQ process with disabled feedback, prioritization of the uplink transmission or the downlink transmission without the HARQ feedback over the HARQ process with the disabled feedback, or prioritization of the HARQ process with the disabled feedback over the uplink transmission or the downlink transmission without the HARQ feedback. The UE 402 may report the capability, at 406, in a radio capability container to the base station 404 or the UE 402 may report the preference, at 406, to the base station 404 in a RRC message. The reporting, at 902, may be performed by the reporter component 1240 of the apparatus 1202 in FIG. 12.

At 904, the UE may receive an allocation of resources from a base station for an uplink grant or a downlink assignment. For example, referring to FIG. 4, the UE 402 may receive, at 408, from the base station 404 an allocation of resources that includes an UL grant, a DL assignment, a CG, or SPS. The reception, at 904, may be performed by the reception component 1230 of the apparatus 1202 in FIG. 12.

At 906, the UE may determine whether the resources have an associated HARQ process without HARQ feedback but with HARQ retransmission, an associated HARQ process without HARQ feedback and without HARQ retransmission, or an associated HARQ process with HARQ feedback and with HARQ retransmission. For example, referring to FIG. 4, the UE 402 may determine, at 410, a resource association with a HARQ process. The UE 402 may determine whether the resources have one of the associated HARQ processes based on DCI from the base station 404 and/or the UE 402 may determine whether the resources have one of the associated HARQ processes based on whether a set of HARQ processes is in use. The resources may not have the associated HARQ process with the HARQ feedback and the HARQ retransmission if the HARQ process is disabled for the associated resources and/or the resources may not have the associated HARQ process with the HARQ feedback if the HARQ feedback is not configured for a logical channel group on which data is available for transmission. The determination, at 906, may be performed by the determination component 1242 of the apparatus 1202 in FIG. 12.

At 908, the UE may exchange communication with the base station based on the allocation of resources and the determination of whether the resources have one of the associated HARQ processes. For example, referring to FIG. 4, the UE 402 may exchange communication, at 412, with the base station 404 based on the allocation of resources, at 408, and the determination, at 410, of resource association with a HARQ process. The exchange, at 908, may be performed by the exchanger component 1244 of the apparatus 1202 in FIG. 12.

At 910, the UE may transmit a SR based on a configuration for a logical channel or a logical channel group that does not have the association with at least one of the HARQ feedback or the HARQ retransmission. For example, referring to FIG. 4, the UE 402 may transmit, at 417, the scheduling request to the base station 404. The transmission, at 910, may be performed by the transmission component 1234 of the apparatus 1202 in FIG. 12.

At 912, where the allocation of the resources includes the uplink grant, the UE may exchange the communication with the base station based on transmitting an uplink transmission based on the uplink grant, monitoring for HARQ feedback if the resources have the association with the HARQ feedback, and skipping the monitoring for the HARQ feedback if the resources do not have the association with the HARQ feedback. For example, referring to FIG. 4, the UE 402 may transmit, at 416 an UL transmission when the UL grant is included/received, at 408, with the allocation of resources. Further, the UE 402 may monitor, at 418 for HARQ feedback if the resources allocated, at 408, have the association with the HARQ feedback or the UE 402 may skip monitoring, at 418, for the HARQ feedback if the resources allocated, at 408, do not have the association with the HARQ feedback. The UE 402 may determine, at 410, that the resources allocated, at 408, do not have the associated HARQ process without the HARQ feedback and without the HARQ retransmission based on an absence of the HARQ feedback and the HARQ retransmission from the resources in the uplink grant, such that the UE 402 may transmit, at 416, the uplink transmission without buffering. Additionally or alternatively, the UE 402 may determine, at 410, that the resources allocated, at 408, do not have the associated HARQ feedback based on the uplink grant indicating a HARQ process having disabled HARQ feedback. The transmission, at 912, may be performed by the transmission component 1234 of the apparatus 1202 in FIG. 12.

At 914, the UE may buffer the uplink transmission after transmission and retransmit the uplink transmission if a retransmission uplink grant is received from the base station. For example, referring to FIG. 4, the UE 402 may buffer, at 422, the UL transmission after the UL transmission is transmitted, at 416. The UE 402 may further retransmit, at 424, the UL transmission based on an UL retransmission grant received from the base station 404. The buffering, at 914, may be performed by the buffer component 1246 of the apparatus 1202 in FIG. 12.

At 916, the UE may apply a priority rule to transmit a truncated BSR based on an intended use of a HARQ process. For example, referring to FIG. 4, the UE 402 may apply the priority rule at 426. In aspects, application of the priority rule, at 426, may cause the UE 402 to transmitted a truncated BSR to the base station 404. The application, at 916, may be performed by the application component 1248 of the apparatus 1202 in FIG. 12.

At 918, where the allocation of the resources comprises the downlink assignment, the UE may exchange the communication with the base station based on receiving a downlink transmission based on the downlink assignment, skipping the HARQ feedback and storing the downlink transmission in a HARQ buffer for possible retransmission if the resources do not have the associated HARQ feedback, and completing the downlink transmission without storing the downlink transmission in the HARQ buffer if the resources do not have the associated HARQ feedback and do not have the associated HARQ retransmission. For example, referring to FIG. 4, the UE 402 may receive, at 414, a DL transmission from the base station 404 when the DL assignment is included/received, at 408, with the allocation of resources. Further, the UE 402 may skip, at 418, the HARQ feedback and store the downlink transmission in a HARQ buffer, at 422, for possible retransmission or the UE 402 may complete the downlink transmission without storing the downlink transmission in the HARQ buffer, at 422. The UE 402 may determine, at 410, that the resources allocated, at 408, do not have the associated HARQ feedback based on an absence of a HARQ process for the resources in the downlink assignment, such that the UE 402 may receive, at 414, the downlink transmission without buffering. Additionally or alternatively, the UE 402 may determine, at 410, that the resources allocated, at 408, do not have the associated HARQ feedback based on the downlink assignment indicating a HARQ process having disabled HARQ feedback. The reception, at 918, may be performed by the reception component 1230 of the apparatus 1202 in FIG. 12.

At 920, the UE may buffer the downlink transmission after reception and combine the downlink transmission with a retransmission that is received from the base station. For example, referring to FIG. 4, the UE 402 may buffer, at 422, the DL transmission that was transmitted, at 416. The UE 402 may further transmit, at 424, DL transmission information from the base station 404, the DL transmission information being combined with a retransmission, at 424. The buffering, at 920, may be performed by the buffer component 1246 of the apparatus 1202 in FIG. 12.

At 922, where the allocation of the resources includes the configured grant, the UE may skip an uplink transmission based on an instance of the configured grant if the uplink transmission includes data requiring HARQ feedback or HARQ retransmission and a HARQ process ID for the instance has disabled HARQ feedback. For example, referring to FIG. 4, the UE 402 may skip, at 418, an UL transmission associated with the CG received/included with the allocation of resources, at 408, based on enabled/disabled HARQ feedback. If HARQ retransmission is disabled, the allocation of resources, at 408, may not include a configured grant timer. Further, the UE 402 may determine, at 410, that the HARQ retransmission is disabled based on an absence of the configured grant timer. The skipping, at 922, may be performed by the skipping component 1250 of the apparatus 1202 in FIG. 12.

At 924, where HARQ feedback is enabled for the resources, the UE may receive a configuration for a number of HARQ processes that is greater than sixteen. For example, referring to FIG. 4, the UE 402 may receive, at 414, a configuration for 16 or more HARQ processes. The UE 402 may receive, at 408, multiple configured grants or multiple SPS configurations including at least a first set of resources having at least one of the HARQ feedback or the HARQ retransmissions disabled. The first set of resources may be configured with a HARQ process having disabled HARQ feedback or disabled HARQ retransmissions based on a configuration of a number of HARQ processes equal to one. The reception, at 924, may be performed by the reception component 1230 of the apparatus 1202 in FIG. 12.

Figure 10:
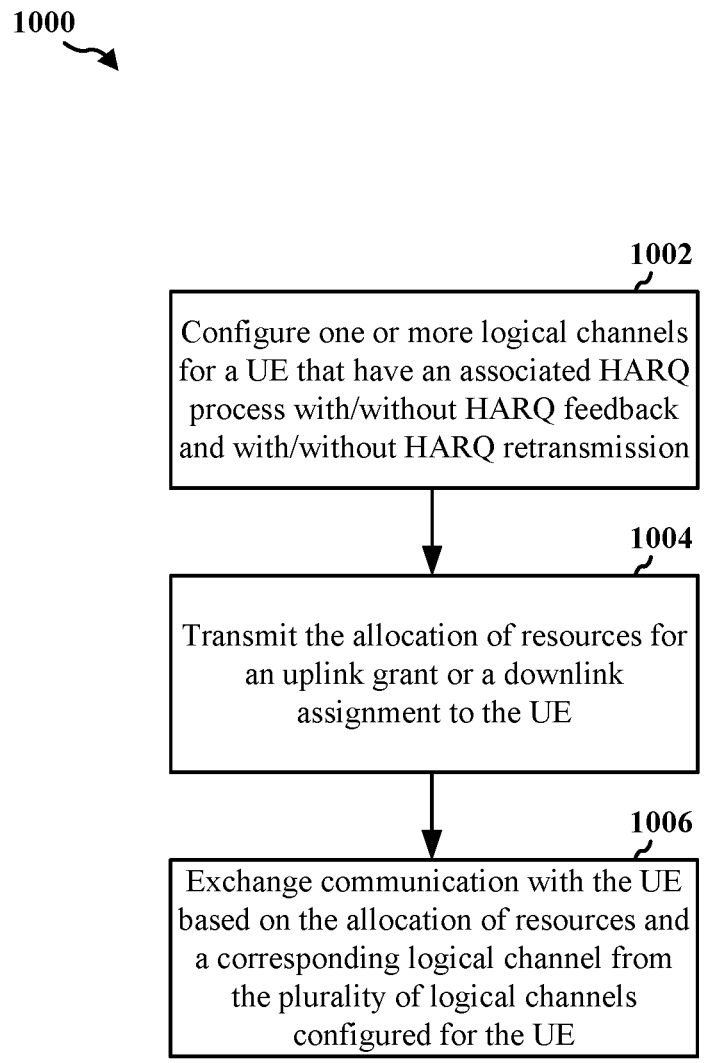
FIG. 10 is a flowchart of a method of wireless communication at a base station.

FIG. 10 is a flowchart 1000 of a method of wireless communication. The method may be performed by a base station, e.g., the base station 102, which may include the memory 376 and which may be the entire base station 102 or a component of the base station 102, such as the TX processor 316, the RX processor 370, and/or the controller/processor 375. The method may provide an improved technique for reducing delayed HARQ conditions.

At 1002, the base station may configure a plurality of logical channels for the UE, where one or more logical channels have an associated HARQ process without HARQ feedback but with HARQ retransmission, an associated HARQ process without HARQ feedback and without HARQ retransmission, or an associated HARQ process with HARQ feedback and with HARQ retransmission. For example, referring to FIG. 4, the base station 404 may configure, at 407, one or more of the logical channels based on an associated HARQ process. The configuration, at 1002, may be performed by the configuration component 1340 of the apparatus 1302 in FIG. 13.

At 1004, the base station may transmit an allocation of resources for an uplink grant or a downlink assignment to the UE. For example, referring to FIG. 4, the base station 404 may transmit, at 408, to the UE 402 an allocation of resources that includes an UL grant, a DL assignment, a CG, or SPS. The base station 404 may configure each CG or each SPS using a number of configurations based on whether the allocation of resources, at 408, includes associated HARQ feedback. The transmission, at 1004, may be performed by the transmission component 1334 of the apparatus 1302 in FIG. 13.

At 1006, the base station may exchange communication with the UE based on the allocation of resources and a corresponding logical channel from the plurality of logical channels configured for the UE. For example, referring to FIG. 4, the base station 404 may exchange communication, at 412, with the UE 402 based on the allocation of resources, at 408, and the logical cannels configured, at 407. The exchange, at 1006, may be performed by the exchanger component 1342 of the apparatus 1302 in FIG. 13.

Figure 11:
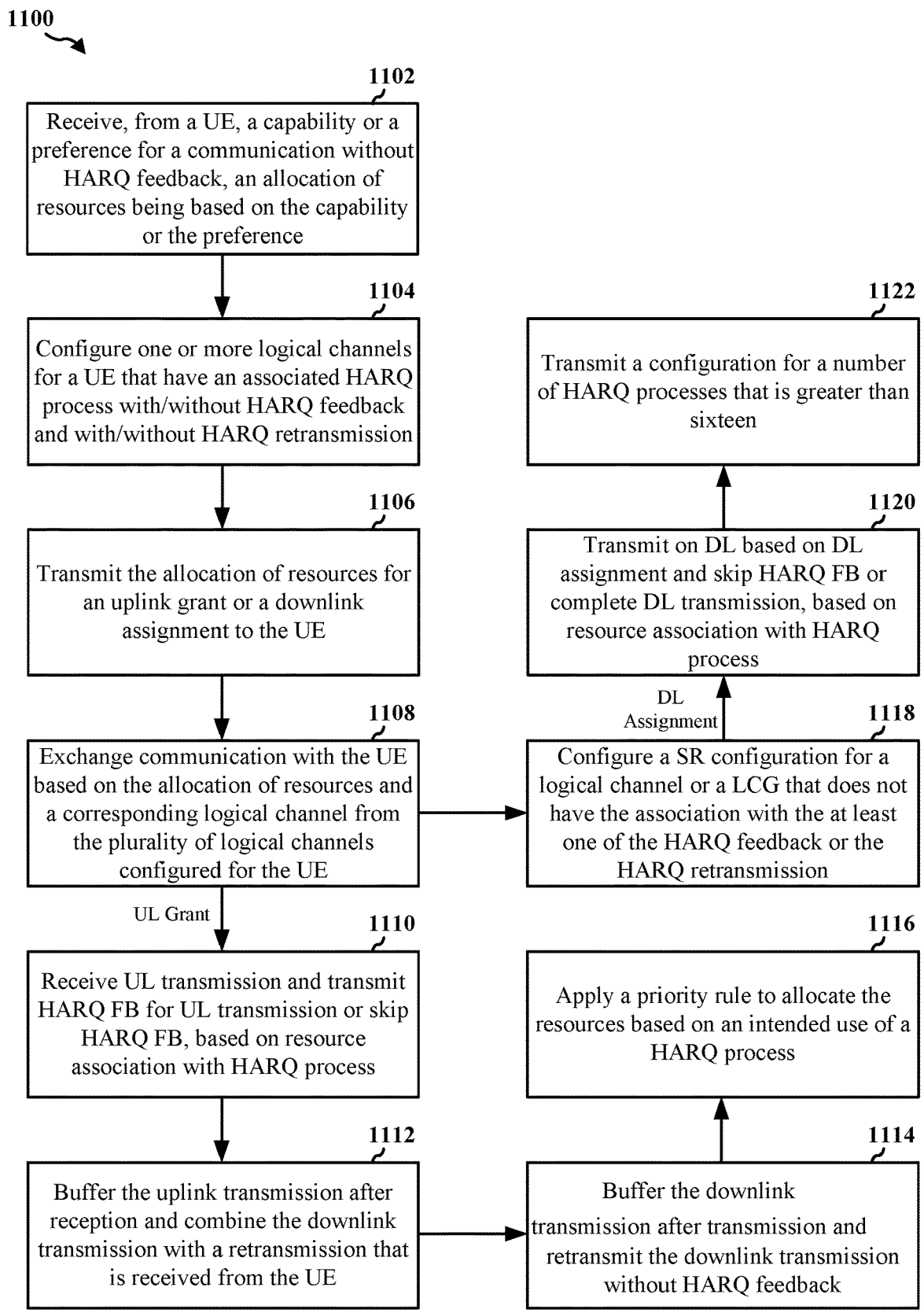
FIG. 11 is a flowchart of a method of wireless communication at a base station.

FIG. 11 is a flowchart 1100 of a method of wireless communication. The method may be performed by a base station, e.g., the base station 102, which may include the memory 376 and which may be the entire base station 102 or a component of the base station 102, such as the TX processor 316, the RX processor 370, and/or the controller/processor 375. The method may provide an improved technique for reducing delayed HARQ conditions.

At 1102, the base station may receive, from the UE, a capability or a preference for a communication without HARQ feedback, where an allocation of resources is based on the capability or the preference. For example, referring to FIG. 4, the base station 404 may receive, at 406, the communication capability or preference of the UE 402 as a basis for transmitting, at 408, the allocation of resources. The capability or the preference may be for at least one of uplink transmission without the HARQ feedback, downlink transmission without the HARQ feedback, the HARQ feedback to use if all supported HARQ processes are in use, a combination of the uplink transmission or the downlink transmission with the HARQ feedback and a HARQ process with disabled HARQ feedback and HARQ retransmission, and a HARQ process with disabled feedback, prioritization of the uplink transmission or the downlink transmission without the HARQ feedback over the HARQ process with the disabled feedback, or prioritization of the HARQ process with the disabled feedback over the uplink transmission or the downlink transmission without the HARQ feedback. The base station 404 may receive the capability, at 406, in a radio capability container from the UE 402 or the base station 404 may receive the preference, at 406, from the UE 402 in a RRC message. The reception, at 1102, may be performed by the reception component 1330 of the apparatus 1302 in FIG. 13.

At 1104, the base station may configure a plurality of logical channels for the UE, where one or more logical channels have an associated HARQ process without HARQ feedback but with HARQ retransmission, an associated HARQ process without HARQ feedback and without HARQ retransmission, or an associated HARQ process with HARQ feedback and with HARQ retransmission. For example, referring to FIG. 4, the base station 404 may configure, at 407, one or more of the logical channels based on an associated HARQ process. The configuration, at 1104, may be performed by the configuration component 1340 of the apparatus 1302 in FIG. 13.

At 1106, the base station may transmit an allocation of resources for an uplink grant or a downlink assignment to the UE. For example, referring to FIG. 4, the base station 404 may transmit, at 408, to the UE 402 an allocation of resources that includes an UL grant, a DL assignment, a CG, or SPS. The base station 404 may configure each CG or each SPS using a number of configurations based on whether the allocation of resources, at 408, includes associated HARQ feedback. HARQ retransmission may be disabled, such that the allocation of resources, at 408, may not include a configured grant timer. An absence of the configured grant timer may indicate to the UE 402 that the HARQ retransmission is disabled. The base station 404 may transmit, at 408, multiple configured grants or multiple SPS configurations including at least a first set of resources having at least one of disabled HARQ feedback or disabled HARQ retransmissions. The first set of resources may be configured with a HARQ process having disabled HARQ feedback or disabled HARQ retransmissions based on a configuration of a number of HARQ processes equal to one. The transmission, at 1106, may be performed by the transmission component 1334 of the apparatus 1302 in FIG. 13.

At 1108, the base station may exchange communication with the UE based on the allocation of resources and a corresponding logical channel from the plurality of logical channels configured for the UE. For example, referring to FIG. 4, the base station 404 may exchange communication, at 412, with the UE 402 based on the allocation of resources, at 408, and the logical cannels configured, at 407. The base station 404 may allocate the resources, at 408, for the HARQ process without the HARQ feedback and the base station 404 may exchange the communication with the UE 402 without HARQ feedback. The base station 404 may further allocate the resources, at 408, for the HARQ process without the HARQ feedback based on a set of HARQ processes being in use. The HARQ feedback may be disabled for the HARQ process associated with the resources allocated, at 408, or the HARQ feedback may not be configured for a logical channel group on which data is available for reception. The exchange, at 1108, may be performed by the exchanger component 1342 of the apparatus 1302 in FIG. 13.

At 1110, where the allocation of the resources includes the uplink grant, the base station may exchange the communication with the UE based on receiving an uplink transmission based on the uplink grant, transmitting HARQ feedback for the uplink transmission if the resources have the association with the HARQ feedback, and skipping the HARQ feedback if the resources do not have the association with the HARQ retransmission. For example, referring to FIG. 4, the base station 404 may receive, at 416, an UL transmission based on the UL grant. Further, the base station 404 may transmit, at 414, HARQ feedback for the UL transmission if the resources allocated, at 408, have the association with the HARQ feedback or the base station 404 may skip, at 418, the HARQ feedback if the resources transmitted, at 408, do not have the association with the HARQ retransmission. The resources allocated at 408 may not have the associated HARQ process without the HARQ feedback and without the HARQ retransmission based on an absence of the HARQ feedback and the HARQ retransmission from the resources in the uplink grant, such that the base station 404 may receive, at 416, the uplink transmission without buffering. Additionally or alternatively, the resources allocated at 408 may not have the associated HARQ feedback based on the uplink grant indicating a HARQ process having disabled HARQ feedback. The reception, at 1110, may be performed by the reception component 1330 of the apparatus 1302 in FIG. 13.

At 1112, the base station may buffer the uplink transmission after reception and combine the downlink transmission with a retransmission that is received from the UE. For example, referring to FIG. 4, the base station 404 may buffer, at 422, the UL transmission that was received, at 416. The base station 404 may further receive, at 424, combined DL transmission information with an UL retransmission. The buffering, at 1112, may be performed by the buffer component 1344 of the apparatus 1302 in FIG. 13.

At 1114, the base station may buffer the downlink transmission after transmission and retransmit the downlink transmission without HARQ feedback. For example, referring to FIG. 4, the base station 404 may buffer, at 422, the DL transmission after the UL transmission is received, at 416. The base station 404 may further retransmit, at 425, the DL transmission without HARQ feedback. The buffering, at 1114, may be performed by the buffer component 1344 of the apparatus 1302 in FIG. 13.

At 1116, the base station may apply a priority rule to allocate the resources based on an intended use of a HARQ process. For example, referring to FIG. 4, the base station 404 may apply the priority rule at 426. In aspects, application of the priority rule, at 426, may cause the base station 404 to allocate resources based on the associated HARQ process. The application, at 1116, may be performed by the application component 1346 of the apparatus 1302 in FIG. 13.

At 1118, the base station may configure a SR configuration for a logical channel or a logical channel group that does not have the association with the at least one of the HARQ feedback or the HARQ retransmission. For example, referring to FIG. 4, the base station 404 may receive, at 417, the scheduling request from the UE 402. The configuration, at 1118, may be performed by the configuration component 1340 of the apparatus 1302 in FIG. 13.

At 1120, where the allocation of the resources includes the downlink assignment, the base station may exchange the communication with the UE based on transmitting a downlink transmission based on the downlink assignment, skipping the HARQ feedback and storing the downlink transmission in a HARQ buffer for possible retransmission if the resources do not have the associated HARQ feedback, and completing transmission of the downlink transmission without storing the downlink transmission in the HARQ buffer if the resources do not have the associated HARQ feedback and do not have the associated HARQ retransmission. For example, referring to FIG. 4, the base station 404 may transmit, at 414, a DL transmission based on the DL assignment included/received, at 408, with the allocation of resources. Further, the base station 404 may skip, at 418, the HARQ feedback and store the downlink transmission in a HARQ buffer, at 422, for possible retransmission or the base station 404 may complete the downlink transmission without storing the downlink transmission in the HARQ buffer, at 422. The resources allocated, at 408, may not have the associated HARQ feedback based on an absence of a HARQ process for the resources in the downlink assignment, such that the base station 404 may transmit, at 414, the downlink transmission without buffering. Additionally or alternatively, the resources allocated, at 408, may not have the associated HARQ feedback based on the downlink assignment indicating a HARQ process having disabled HARQ feedback. The transmission, at 1120, may be performed by the transmission component 1334 of the apparatus 1302 in FIG. 13.

At 1122, where HARQ feedback is enabled for the resources, the base station may further transmit a configuration for a number of HARQ processes that is greater than sixteen. For example, referring to FIG. 4, the base station 404 may transmit, at 414, a configuration for 16 or more HARQ processes. The transmission, at 1122, may be performed by the transmission component 1334 of the apparatus 1302 in FIG. 13.

Figure 12:
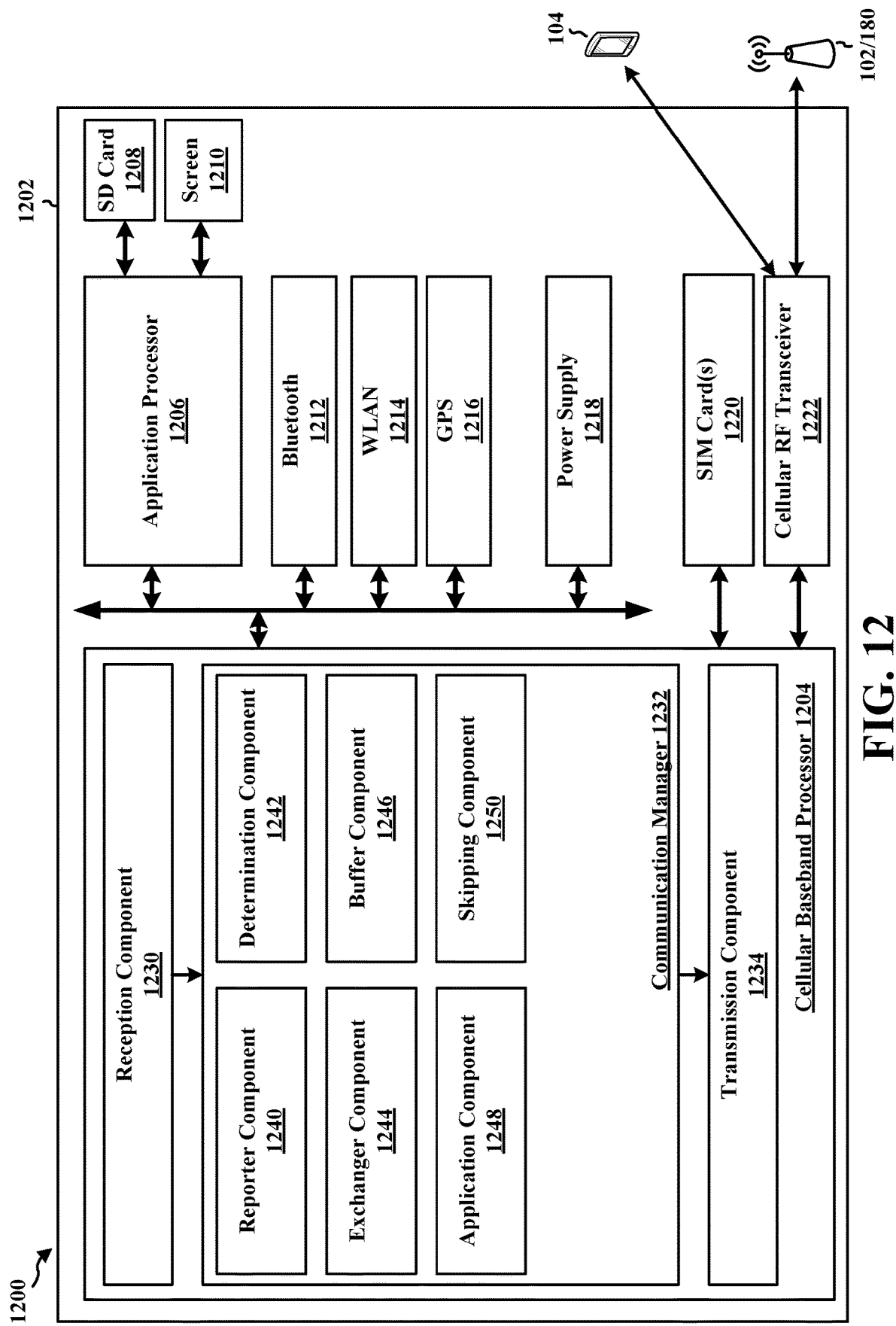
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The reception component 1230 is configured, e.g., as described in connection with 802, 904, 918, and 924, to receive an allocation of resources from a base station for an uplink grant or a downlink assignment; to receive on DL based on DL assignment, and skip HARQ feedback (FB) but store DL transmission in buffer, or complete DL transmission without storing DL transmission in buffer; and to receive a configuration for a number of HARQ processes that is greater than sixteen. The transmission component 1234 is configured, e.g., as described in connection with 910 and 912, to transmit a SR based on a configuration for a logical channel or a LCG that does not have the association with at least one of the HARQ feedback or the HARQ retransmission; and to transmit based on UL grant and monitor for HARQ FB or skip monitoring for HARQ FB, based on resource association with HARQ FB.

The communication manager 1232 includes a reporter component 1240 that is configured, e.g., as described in connection with 902 to report a capability or a preference for a communication without HARQ feedback to a base station prior to receiving an allocation of the resources. The communication manager 1232 further includes a determination component 1242 that is configured, e.g., as described in connection with 804 and 906, to determine whether the resources have an associated HARQ process with/without ARQ feedback and with/without HARQ retransmission. The communication manager 1232 further includes an exchanger component 1244 that is configured, e.g., as described in connection with 806 and 908, to exchange communication with the base station based on the allocation of resources and the determination of whether the resources have one of the associated HARQ processes. The communication manager 1232 further includes a buffer component 1246 that is configured, e.g., as described in connection with 914 and 920, to buffer the uplink transmission after transmission and retransmit the uplink transmission if a retransmission uplink grant is received from the base station; and to buffer a downlink transmission after reception and combine the downlink transmission with a retransmission that is received from the base station. The communication manager 1232 further includes an application component 1248 that is configured, e.g., as described in connection with 916, to apply a priority rule to transmit a truncated buffer status report based on an intended use of a HARQ process. The communication manager 1232 further includes a skipping component 1250 that is configured, e.g., as described in connection with 922, to skip UL transmission based on instance of CG if the UL transmission includes data requiring HARQ FB or HARQ retransmission and a HARQ process ID for the instance has disabled HARQ FB.

The apparatus may include additional components that perform each of the blocks of the algorithm in the flowcharts of FIGS. 8-9. As such, each block in the flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving an allocation of resources from a base station for an uplink grant or a downlink assignment; means for determining whether the resources have an associated HARQ process without HARQ feedback but with HARQ retransmission, an associated HARQ process without HARQ feedback and without HARQ retransmission, or an associated HARQ process with HARQ feedback and with HARQ retransmission; and means for exchanging communication with the base station based on the allocation of resources and the determination of whether the resources have one of the associated HARQ processes. The apparatus 1202 further includes means for transmitting a scheduling request (SR) based on a configuration for a logical channel or a logical channel group that does not have the association with at least one of the HARQ feedback or the HARQ retransmission. The means for exchanging the communication with the base station is further configured to: transmit an uplink transmission based on the uplink grant; monitor for HARQ feedback if the resources have the association with the HARQ feedback; and skip the monitoring for the HARQ feedback if the resources do not have the association with the HARQ feedback. The apparatus 1202 further includes means for buffering the uplink transmission after transmission; and means for retransmitting the uplink transmission if a retransmission uplink grant is received from the base station. The apparatus 1202 further includes means for applying a priority rule to transmit a truncated BSR based on an intended use of a HARQ process.

The means for exchanging the communication with the base station is further configured to receive a downlink transmission based on the downlink assignment; skip the HARQ feedback and storing the downlink transmission in a HARQ buffer for possible retransmission if the resources do not have the associated HARQ feedback; and complete the downlink transmission without storing the downlink transmission in the HARQ buffer if the resources do not have the associated HARQ feedback and do not have the associated HARQ retransmission The apparatus 1202 further includes means for buffering the downlink transmission after reception; and means for combining the downlink transmission with a retransmission that is received from the base station. The apparatus 1202 further includes means for skipping an uplink transmission based on an instance of the configured grant if the uplink transmission includes data requiring HARQ feedback or HARQ retransmission and a HARQ process ID for the instance has disabled HARQ feedback. The apparatus 1202 further includes means for receiving a configuration for a number of HARQ processes that is greater than sixteen. The apparatus 1202 further includes means for reporting a capability or a preference for the communication without HARQ feedback to the base station prior to receiving the allocation of the resources.

The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
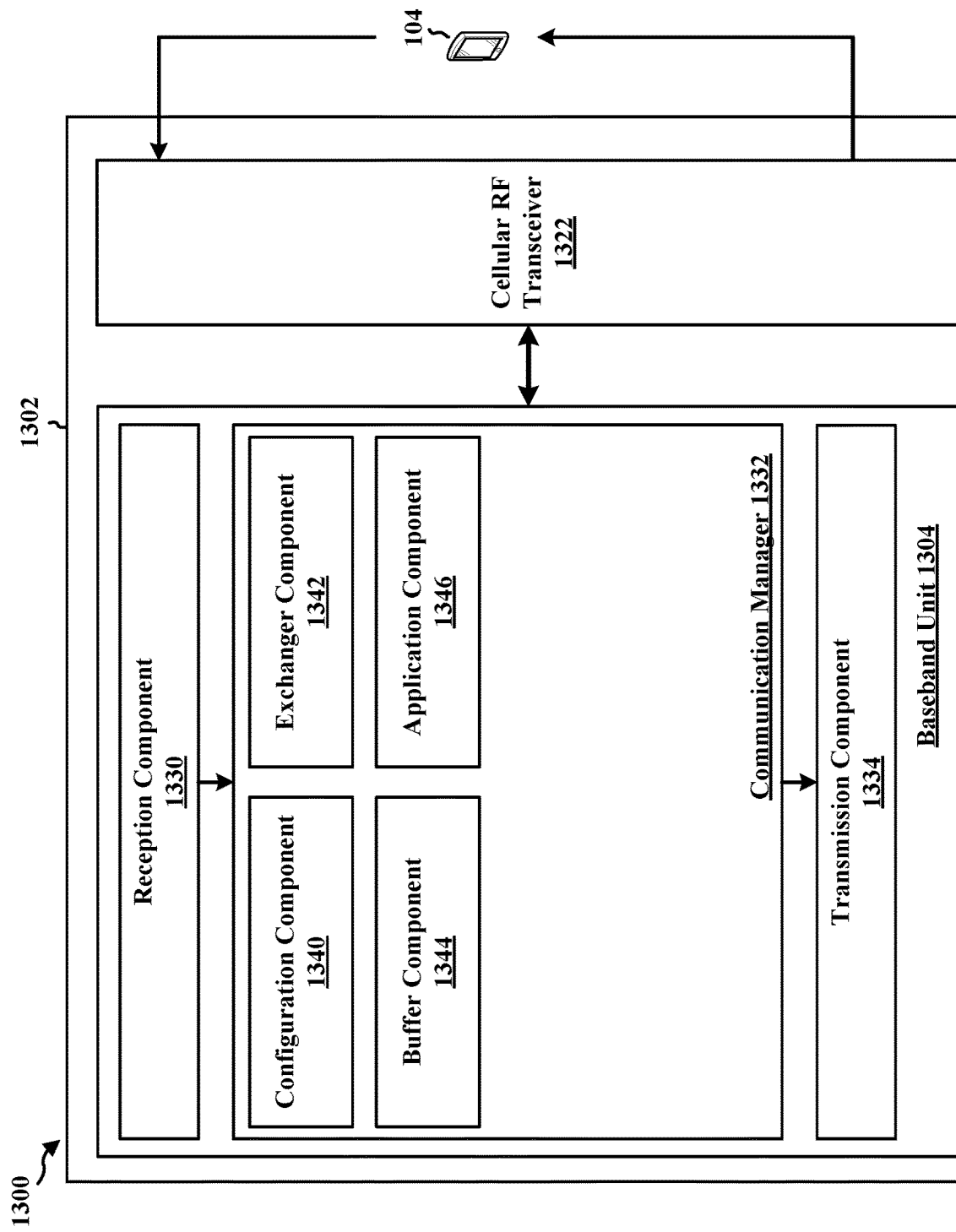
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1202 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The reception component 1330 is configured, e.g., as described in connection with 1102 and 1110, to receive, from a UE, a capability or a preference for a communication without HARQ feedback, an allocation of resources being based on the capability or the preference; and to receive UL transmission and transmit HARQ FB for UL transmission or skip HARQ FB, based on resource association with HARQ process. The transmission component 1334 is configured, e.g., as described in connection with 1004, 1106, 1120, and 1122, to transmit the allocation of resources for an uplink grant or a downlink assignment to the UE; to transmit on DL based on DL assignment and skip HARQ FB or complete DL transmission, based on resource association with HARQ process; and to transmit a configuration for a number of HARQ processes that is greater than sixteen.

The communication manager 1332 includes a configuration component 1340 that is configured, e.g., as described in connection with 1002, 1104, and 1118, to configure one or more logical channels for a UE that have an associated HARQ process with/without HARQ feedback and with/without HARQ retransmission; and to configure a SR configuration for a logical channel or a LCG that does not have the association with the at least one of the HARQ feedback or the HARQ retransmission. The communication manager 1332 further includes an exchanger component 1342 that is configured, e.g., as described in connection with 1006 and 1108, to exchange communication with the UE based on the allocation of resources and a corresponding logical channel from the plurality of logical channels configured for the UE. The communication manager 1332 further includes a buffer component 1344 that is configured, e.g., as described in connection with 1112 and 1114, to buffer the uplink transmission after reception and combine the downlink transmission with a retransmission that is received from the UE; and to buffer the downlink transmission after transmission and retransmit the downlink transmission without HARQ feedback. The communication manager 1332 further includes an application component 1346 that is configured, e.g., as described in connection with 1116, to apply a priority rule to allocate the resources based on an intended use of a HARQ process.

The apparatus may include additional components that perform each of the blocks of the algorithm in the flowcharts of FIGS. 11-12. As such, each block in the flowcharts of FIGS. 11-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for configuring a plurality of logical channels for a user equipment, wherein one or more logical channels have an associated HARQ process without HARQ feedback but with HARQ retransmission, an associated HARQ process without HARQ feedback and without HARQ retransmission, or an associated HARQ process with HARQ feedback and with HARQ retransmission; means for transmitting an allocation of resources for an uplink grant or a downlink assignment to the UE; and means for exchanging communication with the UE based on the allocation of resources and a corresponding logical channel from the plurality of logical channels configured for the UE. The means for exchanging the communication with the UE is further configured to: receive an uplink transmission based on the uplink grant; transmit HARQ feedback for the uplink transmission if the resources have the association with the HARQ feedback; and skip the HARQ feedback if the resources do not have the association with the HARQ retransmission. The apparatus 1302 further includes means for buffering the uplink transmission after reception; and means for combining the downlink transmission with a retransmission that is received from the UE. The apparatus 1302 further includes means for buffering the downlink transmission after transmission; and means for retransmitting the downlink transmission without HARQ feedback. The apparatus 1302 further includes means for applying a priority rule to allocate the resources based on an intended use of a HARQ process.

The apparatus 1302 further includes means for configuring a scheduling request configuration for a logical channel or a logical channel group that does not have the association with the at least one of the HARQ feedback or the HARQ retransmission. The means for exchanging the communication with the UE is further configured to: transmit a downlink transmission based on the downlink assignment; skip the HARQ feedback and storing the downlink transmission in a HARQ buffer for possible retransmission if the resources do not have the associated HARQ feedback; and complete transmission of the downlink transmission without storing the downlink transmission in the HARQ buffer if the resources do not have the associated HARQ feedback and do not have the associated HARQ retransmission. The apparatus 1302 further includes means for transmitting a configuration for a number of HARQ processes that is greater than sixteen. The apparatus 1302 further includes means for receiving, from the UE, a capability or a preference for the communication without HARQ feedback, wherein the allocation of the resources is based on the capability or the preference.

The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE comprising: receiving an allocation of resources from a base station for an uplink grant or a downlink assignment; selecting resources that have an associated HARQ process type, the associated HARQ process type including at least one of a first HARQ process without HARQ feedback and with HARQ retransmission, a second HARQ process without the HARQ feedback and without the HARQ retransmission, or a third HARQ process with the HARQ feedback and with the HARQ retransmission; and exchanging communication with the base station based on the allocation of the resources and the selection of the resources that have one of the associated HARQ process types.

Aspect 2 may be combined with aspect 1 and further includes selecting the resources that have one of the associated HARQ process types based on DCI from the base station.

Aspect 3 may be combined with any of aspects 1-2 and further includes selecting the resources that have one of the associated HARQ process types based on whether a set of HARQ processes is in use.

Aspect 4 may be combined with any of aspects 1-3 and includes that the resources do not have the third HARQ process with the HARQ feedback and the HARQ retransmission if the associated HARQ process type is disabled for the resources.

Aspect 5 may be combined with any of aspects 1-4 and includes that the resources do not have the third HARQ process with the HARQ feedback if the HARQ feedback is not configured for a logical channel group on which data is available for transmission.

Aspect 6 may be combined with any of aspects 1-5 and includes that the allocation of the resources comprises the uplink grant, and wherein exchanging the communication with the base station further comprises: transmitting an uplink transmission based on the uplink grant; monitoring PDCCH scheduling for retransmission in a same HARQ process if the resources are associated with the HARQ retransmission; and monitoring the PDCCH scheduling of a second transmission in the same HARQ process if the resources are not associated with the HARQ retransmission.

Aspect 7 may be combined with any of aspects 1-6 and includes that the second HARQ process without the HARQ feedback and without the HARQ retransmission corresponds to a deactivated HARQ process, and wherein the UE transmits the uplink transmission without buffering.

Aspect 8 may be combined with any of aspects 1-7 and includes that the first HARQ process without the HARQ feedback and with the HARQ retransmission corresponds to the monitoring of the PDCCH scheduling for the transmission in the same HARQ process, wherein the monitoring is performed without a HARQ RTT timer or with a zero length RTT timer, and wherein the UE transmits the uplink transmission with buffering.

Aspect 9 may be combined with any of aspects 1-8 and includes that the third HARQ process with the HARQ feedback and with the HARQ retransmission corresponds to the monitoring of the PDCCH scheduling for the transmission in the same HARQ process after an expiration of a HARQ RTT timer associated with an RTT, and wherein the UE transmits the uplink transmission with buffering.

Aspect 10 may be combined with any of aspects 1-9 and includes that the allocation of the resources includes a CG or SPS.

Aspect 11 may be combined with any of aspects 1-10 and includes that the allocation of the resources comprises the configured grant, the method further comprising: skipping an uplink transmission at a CG occasion or an SPS occasion if the uplink transmission includes data for a HARQ process type that is different from a different HARQ process type associated with the CG occasion or the SPS occasion.

Aspect 12 may be combined with any of aspects 1-11 and includes that an absence of a CG timer indicates that the HARQ retransmission is disabled.

Aspect 13 may be combined with any of aspects 1-12 and includes that the HARQ feedback is enabled for the resources, the method further comprising: receiving a configuration for a number of HARQ processes that is greater than sixteen.

Aspect 14 may be combined with any of aspects 1-13 and further includes receiving multiple configured grants or multiple SPS configurations including at least a first set of resources configured to have at least one of the associated HARQ process types.

Aspect 15 may be combined with any of aspects 1-14 and includes that the first set of resources are configured with the associated HARQ process type, and wherein the associated HARQ process type includes disabled HARQ feedback or disabled HARQ retransmission based on a configuration of a number of HARQ processes being equal to one.

Aspect 16 may be combined with any of aspects 1-15 and further includes reporting a capability or a preference for the communication with the associated HARQ process type to the base station prior to receiving the allocation of the resources.

Aspect 17 may be combined with any of aspects 1-16 and further includes reporting a truncated BSR of at least one logical channel group based on a plurality of logical channel groups that include data associated with a same associated HARQ process type or different associated HARQ process types.

Aspect 18 is a method of wireless communication at a base station comprising: configuring a plurality of logical channels for a UE, wherein one or more of the plurality of logical channels have an associated HARQ process type, the associate HARQ process type including at least one of a first HARQ process without HARQ feedback and with HARQ retransmission, a second HARQ process without the HARQ feedback and without the HARQ retransmission, or a third HARQ process with the HARQ feedback and with the HARQ retransmission; transmitting an allocation of resources for an uplink grant or a downlink assignment to the UE; and exchanging communication with the UE based on the allocation of the resources and a corresponding logical channel from the plurality of logical channels configured for the UE.

Aspect 19 may be combined with aspect 18 and further includes indicating, via DCI, that the associated HARQ process type associated with the allocation of the resources is without the HARQ feedback, wherein the base station exchanges the communication with the UE without the HARQ feedback.

Aspect 20 may be combined with any of aspects 18-19 and further includes allocating the resources for the associated HARQ process type without the HARQ feedback based on a set of HARQ processes being in use.

Aspect 21 may be combined with any of aspects 18-20 and includes that the allocation of the resources corresponds to the associated HARQ process type without the HARQ feedback if the HARQ feedback is not configured for a logical channel group on which data is available.

Aspect 22 may be combined with any of aspects 18-21 and includes that the allocation of the resources comprises the downlink assignment, and wherein to exchange the communication with the UE the method further comprises: transmitting a first downlink transmission based on the downlink assignment; and scheduling, for a same HARQ process, a first PDCCH for a retransmission if the resources are associated with the HARQ retransmission or a second PDCCH for a second downlink transmission if the resources are not associated with the HARQ retransmission.

Aspect 23 may be combined with any of aspects 18-22 and includes that the second HARQ process without the HARQ feedback and without the HARQ retransmission corresponds to a deactivated HARQ process, and wherein the base station transmits at least one of the first downlink transmission or the second downlink transmission without buffering.

Aspect 24 may be combined with any of aspects 18-23 and includes that a HARQ process with the HARQ retransmission corresponds to the first PDCCH scheduled for the retransmission in the same HARQ process, and wherein the HARQ process with the HARQ retransmission is performed without a HARQ RTT timer or with a zero length HARQ RTT timer if the HARQ feedback is disabled, or after an expiration of the HARQ RTT timer if the HARQ feedback is enabled, the HARQ RTT timer associated with an RTT.

Aspect 25 may be combined with any of aspects 18-24 and includes that the allocation of the resources includes a CG or SPS.

Aspect 26 may be combined with any of aspects 18-25 and further includes configuring each CG or each SPS using a number of configurations based on whether the allocation includes a HARQ process type that is different from a different HARQ process type associated with the CG or the SPS.

Aspect 27 may be combined with any of aspects 18-26 and includes that an absence of a CG timer indicates to the UE that the HARQ retransmission is disabled.

Aspect 28 may be combined with any of aspects 18-27 and includes that the HARQ feedback is enabled for the resources, the method further comprising transmitting a configuration for a number of HARQ processes that is greater than sixteen.

Aspect 29 may be combined with any of aspects 18-28 and further includes transmitting multiple configured grants or multiple SPS configurations including at least a first set of resources configured to have at least one of the associate HARQ process types.

Aspect 30 may be combined with any of aspects 18-29 and further includes receiving, from the UE, a capability or a preference for the communication with the associated HARQ process type, and wherein the allocation of the resources is based on the capability or the preference.

Aspect 31 is an apparatus for wireless communication including at least one processor coupled to a memory and configured to implement any of the aspects 1-30.

Aspect 32 may be combined with aspect 31 and further includes a transceiver coupled to the at least one processor.

Aspect 33 is an apparatus for wireless communication including means for implementing any of aspects 1-30.

Aspect 34 is a computer-readable medium storing computer executable code, the code when executed by at least one processor causes the at least one processor to implement any of aspects 1-30.

What is claimed is:
1. An apparatus for wireless communication at a user equipment (UE), comprising:
   memory; and
   at least one processor coupled to the memory and configured to:

receive an allocation of resources from a base station for an uplink grant or a downlink assignment, wherein the allocation of the resources includes a configured grant (CG) or semi-persistent scheduling (SPS), select resources that have an associated hybrid automatic repeat request (HARQ) process type, the associated HARQ process type being a first HARQ process without HARQ feedback and with HARQ retransmission, a second HARQ process without the HARQ feedback and without the HARQ retransmission, or a third HARQ process with the HARQ feedback and with the HARQ retransmission;

exchange communication with the base station based on the allocation of the resources and the selection of the resources that have one of the associated HARQ process types; and skip an uplink transmission at a CG occasion or an SPS occasion if the uplink transmission includes data for a HARQ process type that is different from a HARQ process type associated with the CG occasion or the SPS occasion.

2. The apparatus of claim 1, wherein the at least one processor is further configured to select the resources that have one of the associated HARQ process types based on downlink control information (DCI) from the base station.

3. The apparatus of claim 1, wherein the at least one processor is further configured to select the resources that have one of the associated HARQ process types based on whether a set of HARQ processes is in use.

4. The apparatus of claim 1, wherein the resources do not have the third HARQ process with the HARQ feedback and the HARQ retransmission if the associated HARQ process type is disabled for the resources.

5. The apparatus of claim 1, wherein the resources do not have the third HARQ process with the HARQ feedback if the HARQ feedback is not configured for a logical channel group on which data is available for transmission.

6. The apparatus of claim 1, wherein the allocation of the resources comprises the uplink grant, and wherein to exchange the communication with the base station the at least one processor is further configured to:

transmit an uplink transmission based on the uplink grant;

monitor physical downlink control channel (PDCCH) scheduling for retransmission in a same HARQ process if the resources are associated with the HARQ retransmission; and monitor the PDCCH scheduling of a second transmission in the same HARQ process if the resources are not associated with the HARQ retransmission.

7. The apparatus of claim 6, wherein the second HARQ process without the HARQ feedback and without the HARQ retransmission corresponds to a deactivated HARQ process, and wherein to transmit the uplink transmission, the at least one processor is configured to transmit the uplink transmission without buffering.

8. The apparatus of claim 6, wherein the first HARQ process without the HARQ feedback and with the HARQ retransmission corresponds to the at least one processor being configured to monitor the PDCCH scheduling for the transmission in the same HARQ process, wherein to monitor the PDCCH scheduling for the retransmission, the at least one processor is configured to monitor the PDCCH scheduling without a HARQ round trip time (RTT) timer or with a zero length RTT timer, and wherein to transmit the uplink transmission, the at least one processor is configured to transmit the uplink transmission with buffering.

9. The apparatus of claim 6, wherein the third HARQ process with the HARQ feedback and with the HARQ retransmission corresponds to the at least one processor being configured to monitor the PDCCH scheduling for the transmission in the same HARQ process after an expiration of a HARQ round trip time (RTT) timer associated with an RTT, and wherein to transmit the uplink transmission, the at least one processor is configured to transmit the uplink transmission with buffering.

10. The apparatus of claim 1, wherein an absence of a CG timer indicates that the HARQ retransmission is disabled.

11. The apparatus of claim 1, wherein the HARQ feedback is enabled for the resources, wherein the at least one processor is further configured to receive a configuration for a number of HARQ processes that is greater than sixteen.

12. The apparatus of claim 1, wherein the at least one processor is further configured to receive multiple configured grants or multiple SPS configurations including at least a first set of resources configured to have at least one of the associated HARQ process types.

13. The apparatus of claim 12, wherein the first set of resources is configured with the associated HARQ process type, and wherein the associated HARQ process type includes disabled HARQ feedback or disabled HARQ retransmission based on a configuration of a number of HARQ processes being equal to one.

14. The apparatus of claim 1, wherein the at least one processor is further configured to report a capability or a preference for the communication with the associated HARQ process type to the base station prior to reception of the allocation of the resources.

15. The apparatus of claim 1, wherein the at least one processor is further configured to report a truncated buffer status report (BSR) of at least one logical channel group based on a plurality of logical channel groups that include data associated with a same associated HARQ process type or different associated HARQ process types.

16. An apparatus for wireless communication at a base station, comprising:

memory; and at least one processor coupled to the memory and configured to:

configure a plurality of logical channels for a user equipment (UE), wherein one or more of the plurality of logical channels have an associated hybrid automatic repeat request (HARQ) process type, the associated HARQ process type being a first HARQ process without HARQ feedback and with HARQ retransmission, a second HARQ process without the HARQ feedback and without the HARQ retransmission, or a third HARQ process with the HARQ feedback and with the HARQ retransmission;

transmit an allocation of resources for an uplink grant or a downlink assignment to the UE; and transmit a first downlink transmission based on the downlink assignment; and schedule, for a same HARQ process, a first physical downlink control channel (PDCCH) for a retransmission if the resources are associated with the HARQ retransmission or a second PDCCH for a second downlink transmission if the resources are not associated with the HARQ retransmission.

17. The apparatus of claim 16, wherein the at least one processor is further configured to indicate, via downlink control information (DCI), that the associated HARQ process type associated with the allocation of the resources is without the HARQ feedback, wherein to exchange the communication with the UE, the at least one processor is configured to exchange the communication with the UE without the HARQ feedback.

18. The apparatus of claim 17, wherein the at least one processor is further configured to allocate the resources for the associated HARQ process type without the HARQ feedback based on a set of HARQ processes being in use.

19. The apparatus of claim 17, wherein the allocation of the resources corresponds to the associated HARQ process type without the HARQ feedback if the HARQ feedback is not configured for a logical channel group on which data is available.

20. The apparatus of claim 16, wherein the second HARQ process without the HARQ feedback and without the HARQ retransmission corresponds to a deactivated HARQ process, and wherein to transmit at least one of the first downlink transmission or the second downlink transmission, the at least one processor is configured to transmit at least one of the first downlink transmission or the second downlink transmission without buffering.

21. The apparatus of claim 16, wherein a HARQ process with the HARQ retransmission corresponds to the first PDCCH scheduled for the retransmission in the same HARQ process, and wherein the HARQ process with the HARQ retransmission is performed without a HARQ round trip time (RTT) timer or with a zero length HARQ RTT timer if the HARQ feedback is disabled, or after an expiration of the HARQ RTT timer if the HARQ feedback is enabled, the HARQ RTT timer associated with an RTT.

22. The apparatus of claim 16, wherein the allocation of the resources includes a configured grant (CG) or semi-persistent scheduling (SPS).

23. The apparatus of claim 22, wherein the at least one processor is further configured to configure each CG or each SPS using a number of configurations based on whether the allocation includes a HARQ process type that is different from a different HARQ process type associated with the CG or the SPS.

24. The apparatus of claim 22, wherein an absence of a CG timer indicates to the UE that the HARQ retransmission is disabled.

25. The apparatus of claim 22, wherein the HARQ feedback is enabled for the resources, and wherein the at least one processor is further configured to transmit a configuration for a number of HARQ processes that is greater than sixteen.

26. The apparatus of claim 22, wherein the at least one processor is further configured to transmit multiple configured grants or multiple SPS configurations including at least a first set of resources configured to have at least one of the associate HARQ process types.

27. The apparatus of claim 16, wherein the at least one processor is further configured to receive, from the UE, a capability or a preference for the communication with the associated HARQ process type, and wherein the allocation of the resources is based on the capability or the preference.

* * * * *